US009997116B2

(12) United States Patent
Muto et al.

(10) Patent No.: US 9,997,116 B2
(45) Date of Patent: Jun. 12, 2018

(54) INTEGRATED CIRCUIT DEVICE AND ELECTRONIC DEVICE

(71) Applicant: SEIKO EPSON CORPORATION, Tokyo (JP)

(72) Inventors: Kota Muto, Suwa (JP); Shigeaki Kawano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 219 days.

(21) Appl. No.: 15/048,115

(22) Filed: Feb. 19, 2016

(65) Prior Publication Data

US 2016/0247458 A1    Aug. 25, 2016

(30) Foreign Application Priority Data

Feb. 24, 2015  (JP) ................................ 2015-033758

(51) Int. Cl.
  *G09G 3/04*  (2006.01)
  *G06F 1/32*  (2006.01)
  *G09G 3/34*  (2006.01)

(52) U.S. Cl.
  CPC .......... *G09G 3/344* (2013.01); *G06F 1/3265* (2013.01); *G09G 3/04* (2013.01); *G09G 2300/0857* (2013.01); *G09G 2310/0251* (2013.01); *G09G 2310/0289* (2013.01); *G09G 2310/06* (2013.01); *G09G 2310/08* (2013.01);
  (Continued)

(58) Field of Classification Search
  CPC .. G09G 3/344; G09G 3/04; G09G 2300/0857; G09G 2310/0251; G09G 2310/0289; G09G 2310/06; G09G 2310/08; G09G 2310/021; G09G 2330/021; G09G 2330/022; G09G 2330/028; G09G 2310/065; G09G 2330/023; G09G 2330/02; G09G 2330/00; G09G 2320/103; G06F 1/32; G06F 1/3203; G06F 1/3206;
  (Continued)

(56) References Cited

U.S. PATENT DOCUMENTS 8,659,612 B2 *  2/2014  Yamada ................. G09G 3/344
                                                                345/214
8,704,813 B2 *  4/2014  Hashimoto ............ G09G 3/344
                                                                345/107
(Continued)

FOREIGN PATENT DOCUMENTS

JP    2009-237029 A    10/2009
JP    2010-026019 A     2/2010
(Continued)

*Primary Examiner* — Julie Anne Watko
(74) *Attorney, Agent, or Firm* — Oliff PLC

(57) ABSTRACT

An integrated circuit device that drives an electro-optical panel using a driving waveform which is set in a plurality of phases includes: a driving voltage generation unit that operates while receiving a supply of a power supply voltage generated by a power supply circuit, and generates a plurality of driving voltages to be applied to a plurality of electrodes in the electro-optical panel in each of a plurality of phases, in accordance with display data; and a power supply control unit that sets current supply capability of the power supply circuit to a first level synchronously with a timing of start of a phase, and sets the current supply capability to a second level, which is lower than the first level.

14 Claims, 16 Drawing Sheets

| DRIVING MODE 1 (HIGH-SPEED MODE) | | | | | | | | | |
|---|---|---|---|---|---|---|---|---|---|
| | FRAME NUMBER | | | | | | | | |
| | 1 | 2 | 3 | 4 | 5 | 6 | 7 | 8 | 9 |
| TP | 1 | 1 | 1 | 1 | 0 | 0 | 0 | 0 | 0 |
| BB | 1 | 1 | 1 | 1 | 0 | 0 | 0 | 0 | 0 |
| BW | 0 | 0 | 0 | 0 | 0 | 0 | 0 | 0 | 0 |
| WB | 1 | 1 | 1 | 1 | 1 | 1 | 1 | 1 | 0 |
| WW | 1 | 1 | 1 | 1 | 0 | 0 | 0 | 0 | 0 |
| PHASE NUMBER | 0 | | | | 1 | | | | 2 |
| INDEX NUMBER | 1 | | | | 1 | | | | 0 |
| PHASE LENGTH | 4 | | | | 4 | | | | 1 |
| PHASE TIME (ms) | 160 | | | | 160 | | | | 40 |
| BOOSTING CLOCK SIGNAL FREQUENCY (kHz) | 8 | 4 | 4 | 4 | 8 | 4 | 4 | 4 | 8 |

| DRIVING MODE 2 (LOW-AFTERIMAGE MODE) | | | | | | | | | | | | | |
|---|---|---|---|---|---|---|---|---|---|---|---|---|---|
| | FRAME NUMBER | | | | | | | | | | | | |
| | 1 | 2 | 3 | 4 | 5 | 6 | 7 | 8 | 9 | 10 | 11 | 12 | 13 |
| TP | 0 | 0 | 0 | 0 | 1 | 1 | 1 | 1 | 0 | 0 | 0 | 0 | 0 |
| BB | 0 | 0 | 0 | 0 | 0 | 0 | 0 | 0 | 1 | 1 | 1 | 1 | 0 |
| BW | 0 | 0 | 0 | 0 | 0 | 0 | 0 | 0 | 0 | 0 | 0 | 0 | 0 |
| WB | 1 | 1 | 1 | 1 | 0 | 0 | 0 | 0 | 1 | 1 | 1 | 1 | 0 |
| WW | 1 | 1 | 1 | 1 | 0 | 0 | 0 | 0 | 0 | 0 | 0 | 0 | 0 |
| PHASE NUMBER | 0 | | | | 1 | | | | 2 | | | | 3 |
| INDEX NUMBER | 1 | | | | 1 | | | | 1 | | | | 0 |
| PHASE LENGTH | 4 | | | | 4 | | | | 4 | | | | 1 |
| PHASE TIME (ms) | 160 | | | | 160 | | | | 160 | | | | 40 |
| POWER SUPPLY CIRCUIT | ON | OFF | ON | OFF | ON | OFF | ON | OFF | ON | OFF | ON | OFF | ON |

(52) U.S. Cl.
CPC . *G09G 2330/021* (2013.01); *G09G 2330/022* (2013.01); *G09G 2330/028* (2013.01)

(58) Field of Classification Search
CPC .... G06F 1/3234; G06F 1/3237; G06F 1/3265; G06F 1/26; G06F 1/00; G06F 1/03
See application file for complete search history.

(56) References Cited

U.S. PATENT DOCUMENTS

| | | | | |
|---|---|---|---|---|
| 8,957,884 | B2* | 2/2015 | Yato | G09G 3/16 345/107 |
| 9,026,819 | B2* | 5/2015 | Nguyen Tien | G06F 1/3203 713/320 |
| 2004/0266492 | A1* | 12/2004 | Lehr | G05F 1/66 455/572 |
| 2005/0001812 | A1* | 1/2005 | Amundson | G02F 1/167 345/107 |
| 2007/0262949 | A1* | 11/2007 | Zhou | G09G 3/344 345/107 |
| 2010/0013818 | A1 | 1/2010 | Akai et al. | |
| 2013/0332758 | A1* | 12/2013 | Sasaki | G06F 1/324 713/322 |
| 2014/0075232 | A1* | 3/2014 | Bartling | H03K 3/3562 713/324 |
| 2014/0183336 | A1 | 7/2014 | Hagihara | |
| 2016/0093253 | A1* | 3/2016 | Yang | G09G 3/344 345/214 |

FOREIGN PATENT DOCUMENTS

| | | |
|---|---|---|
| JP | 2011-069894 A | 4/2011 |
| JP | 2012-053084 A | 3/2012 |
| JP | 2012-058614 A | 3/2012 |
| JP | 2014-127928 A | 7/2014 |

* cited by examiner

FIG. 8A

TIMING INFORMATION AT 20°C

| FRAME TIME (ms) | 40 |
|---|---|

| INDEX NUMBER (3bit) | 0 | 1 | 2 | 3 | 4 | 5 | 6 | 7 |
|---|---|---|---|---|---|---|---|---|
| PHASE LENGTH (8bit) | 1 | 4 | 8 | 16 | 32 | 64 | 128 | 255 |
| PHASE TIME (ms) | 40 | 160 | ... | ... | ... | ... | ... | ... |

FIG. 8B

WAVEFORM INFORMATION IN DRIVING MODE 1 (HIGH-SPEED MODE)

| | FRAME NUMBER | | | | | | | | |
|---|---|---|---|---|---|---|---|---|---|
| | 1 | 2 | 3 | 4 | 5 | 6 | 7 | 8 | 9 |
| TP | 1 | 1 | 1 | 1 | 0 | 0 | 0 | 0 | 0 |
| BB | 1 | 1 | 1 | 0 | 0 | 0 | 0 | 0 | 0 |
| BW | 0 | 0 | 0 | 0 | 0 | 1 | 0 | 0 | 0 |
| WB | 1 | 1 | 1 | 1 | 0 | 0 | 0 | 1 | 0 |
| WW | 1 | 1 | 1 | 1 | 0 | 0 | 0 | 0 | 0 |
| PHASE NUMBER | 0 | | | | 1 | | | | 2 |
| INDEX NUMBER | 1 | | | | 1 | | | | 0 |
| PHASE LENGTH | 4 | | | | 4 | | | | 1 |
| PHASE TIME (ms) | 160 | | | | 160 | | | | 40 |
| POWER SUPPLY CIRCUIT | ON | OFF | OFF | OFF | ON | OFF | OFF | OFF | ON |

FIG. 8C

WAVEFORM INFORMATION IN DRIVING MODE 2 (LOW-AFTERIMAGE MODE)

| | FRAME NUMBER | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| TP | 0 | 0 | 0 | 1 | 0 | 0 | 0 | 1 | 0 | 0 | 0 | 1 | 0 |
| BB | 0 | 0 | 0 | 1 | 0 | 0 | 0 | 1 | 0 | 0 | 0 | 1 | 0 |
| BW | 0 | 0 | 0 | 1 | 0 | 0 | 0 | 1 | 0 | 0 | 0 | 1 | 0 |
| WB | 1 | 1 | 1 | 1 | 0 | 0 | 0 | 1 | 1 | 1 | 1 | 1 | 0 |
| WW | 1 | 1 | 1 | 1 | 0 | 0 | 0 | 0 | 1 | 1 | 1 | 0 | 0 |
| PHASE NUMBER | 0 | | | | 1 | | | | 2 | | | | 3 |
| INDEX NUMBER | 1 | | | | 1 | | | | 1 | | | | 1 |
| PHASE LENGTH | 4 | | | | 4 | | | | 4 | | | | 1 |
| PHASE TIME (ms) | 160 | | | | 160 | | | | 160 | | | | 40 |
| POWER SUPPLY CIRCUIT | ON | OFF | OFF | OFF | ON | OFF | OFF | OFF | ON | OFF | OFF | OFF | ON |

FIG. 9A

TIMING INFORMATION AT 0°C

| FRAME TIME (ms) | 80 |
|---|---|

| INDEX NUMBER (3bit) | 0 | 1 | 2 | 3 | 4 | 5 | 6 | 7 |
|---|---|---|---|---|---|---|---|---|
| PHASE LENGTH (8bit) | 1 | 25 | 8 | 16 | 32 | 64 | 128 | 255 |
| PHASE TIME (ms) | 80 | 2000 | ... | ... | ... | ... | ... | ... |

FIG. 9B

WAVEFORM INFORMATION IN DRIVING MODE 1 (HIGH-SPEED MODE)

| | FRAME NUMBER | | | | | | | | | |
|---|---|---|---|---|---|---|---|---|---|---|
| | 1 | 2 | 3 | ... | 25 | 26 | 27 | 28 | ... | 50 | 51 |
| TP | 1 | 1 | 1 | ... | 1 | 0 | 0 | 0 | ... | 0 | 0 |
| BB | 1 | 1 | 1 | ... | 1 | 0 | 0 | 0 | ... | 0 | 0 |
| BW | 0 | 0 | 0 | ... | 0 | 1 | 1 | 1 | ... | 1 | 0 |
| WB | 1 | 0 | 0 | ... | 0 | 1 | 1 | 1 | ... | 1 | 0 |
| WW | 1 | 1 | 1 | ... | 1 | 0 | 0 | 0 | ... | 0 | 0 |
| PHASE NUMBER | 0 | | | | | 1 | | | | 2 | |
| INDEX NUMBER | 1 | | | | | 1 | | | | 0 | |
| PHASE LENGTH | 25 | | | | | 25 | | | | 1 | |
| PHASE TIME (ms) | 2000 | | | | | 2000 | | | | 80 | |
| POWER SUPPLY CIRCUIT | ON | OFF | OFF | OFF | OFF | ON | OFF | OFF | OFF | OFF | ON |

FIG. 9C

WAVEFORM INFORMATION IN DRIVING MODE 2 (LOW-AFTERIMAGE MODE)

| | FRAME NUMBER | | | | | | | | | | | | |
|---|---|---|---|---|---|---|---|---|---|---|---|---|---|
| | 1 | 2 | 3 | ... | 25 | 26 | 27 | 28 | ... | 50 | 51 | 52 | 53 | ... | 75 | 76 |
| TP | 0 | 0 | 0 | ... | 0 | 1 | 1 | 1 | ... | 1 | 0 | 0 | 0 | ... | 0 | 0 |
| BB | 0 | 0 | 0 | ... | 0 | 1 | 1 | 1 | ... | 1 | 0 | 0 | 0 | ... | 1 | 0 |
| BW | 0 | 0 | 0 | ... | 0 | 0 | 0 | 0 | ... | 0 | 1 | 1 | 1 | ... | 0 | 0 |
| WB | 1 | 1 | 1 | ... | 1 | 1 | 1 | 1 | ... | 1 | 0 | 1 | 1 | ... | 1 | 0 |
| WW | 1 | 1 | 1 | ... | 1 | 0 | 0 | 0 | ... | 0 | 0 | 0 | 0 | ... | 0 | 0 |
| PHASE NUMBER | 0 | | | | | 1 | | | | | 2 | | | | 3 | |
| INDEX NUMBER | 1 | | | | | 1 | | | | | 1 | | | | 0 | |
| PHASE LENGTH | 25 | | | | | 25 | | | | | 25 | | | | 1 | |
| PHASE TIME (ms) | 2000 | | | | | 2000 | | | | | 2000 | | | | 80 | |
| POWER SUPPLY CIRCUIT | ON | OFF | OFF | OFF | OFF | ON | OFF | OFF | OFF | OFF | ON | OFF | OFF | OFF | ON | ON |

FIG. 10A

TIMING INFORMATION AT 50°C

| FRAME TIME (ms) | 20 |
|---|---|

| INDEX NUMBER (3bit) | 0 | 1 | 2 | 3 | 4 | 5 | 6 | 7 |
|---|---|---|---|---|---|---|---|---|
| PHASE LENGTH (8bit) | 1 | 5 | 8 | 16 | 32 | 64 | 128 | 255 |
| PHASE TIME (ms) | 20 | 100 | ... | ... | ... | ... | ... | ... |

FIG. 10B

WAVEFORM INFORMATION IN DRIVING MODE 1 (HIGH-SPEED MODE)

| | FRAME NUMBER | | | | | | | | | | |
|---|---|---|---|---|---|---|---|---|---|---|---|
| | 1 | 2 | 3 | 4 | 5 | 6 | 7 | 8 | 9 | 10 | 11 |
| TP | 1 | 1 | 1 | 1 | 1 | 0 | 0 | 0 | 0 | 0 | 0 |
| BB | 1 | 1 | 1 | 1 | 1 | 0 | 0 | 0 | 0 | 0 | 0 |
| BW | 0 | 0 | 0 | 0 | 0 | 1 | 1 | 1 | 1 | 1 | 0 |
| WB | 1 | 1 | 1 | 1 | 1 | 0 | 0 | 1 | 1 | 1 | 0 |
| WW | 1 | 1 | 1 | 1 | 1 | 0 | 0 | 0 | 0 | 0 | 0 |
| PHASE NUMBER | | | 0 | | | | | 1 | | | 2 |
| INDEX NUMBER | | | 1 | | | | | 1 | | | 0 |
| PHASE LENGTH | | | 5 | | | | | 5 | | | 1 |
| PHASE TIME (ms) | | | 100 | | | | | 100 | | | 20 |
| POWER SUPPLY CIRCUIT | ON | OFF | OFF | OFF | OFF | OFF | ON | OFF | OFF | OFF | ON |

FIG. 10C

WAVEFORM INFORMATION IN DRIVING MODE 2 (LOW-AFTERIMAGE MODE)

| | FRAME NUMBER | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| TP | 0 | 0 | 0 | 0 | 0 | 1 | 1 | 1 | 1 | 1 | 0 | 0 | 0 | 0 | 0 | 0 |
| BB | 0 | 0 | 0 | 0 | 0 | 1 | 1 | 1 | 1 | 1 | 1 | 1 | 1 | 1 | 1 | 0 |
| BW | 0 | 0 | 0 | 0 | 0 | 0 | 0 | 0 | 0 | 0 | 0 | 0 | 0 | 0 | 0 | 0 |
| WB | 1 | 1 | 1 | 1 | 1 | 0 | 0 | 0 | 0 | 1 | 1 | 1 | 1 | 1 | 1 | 0 |
| WW | 1 | 1 | 1 | 1 | 1 | 0 | 0 | 0 | 0 | 0 | 0 | 0 | 0 | 0 | 0 | 0 |
| PHASE NUMBER | | | 0 | | | | | 1 | | | | | 2 | | | 3 |
| INDEX NUMBER | | | 1 | | | | | 1 | | | | | 1 | | | 0 |
| PHASE LENGTH | | | 5 | | | | | 5 | | | | | 5 | | | 1 |
| PHASE TIME (ms) | | | 100 | | | | | 100 | | | | | 100 | | | 20 |
| POWER SUPPLY CIRCUIT | ON | OFF | OFF | OFF | OFF | OFF | ON | OFF | OFF | OFF | ON | OFF | OFF | OFF | OFF | ON |

DRIVING MODE 1 (HIGH-SPEED MODE)

| | \multicolumn{9}{c}{FRAME NUMBER} |
|---|---|---|---|---|---|---|---|---|---|
| | 1 | 2 | 3 | 4 | 5 | 6 | 7 | 8 | 9 |
| TP | 1 | 1 | 1 | 1 | 0 | 0 | 0 | 0 | 0 |
| BB | 1 | 1 | 1 | 1 | 0 | 0 | 0 | 0 | 0 |
| BW | 0 | 0 | 0 | 0 | 0 | 0 | 0 | 0 | 0 |
| WB | 1 | 1 | 1 | 1 | 1 | 1 | 1 | 1 | 0 |
| WW | 1 | 1 | 1 | 1 | 0 | 0 | 0 | 0 | 0 |
| PHASE NUMBER | 0 | | | | 1 | | | | 2 |
| INDEX NUMBER | 1 | | | | 1 | | | | 0 |
| PHASE LENGTH | 4 | | | | 4 | | | | 1 |
| PHASE TIME (ms) | 160 | | | | 160 | | | | 40 |
| BOOSTING CLOCK SIGNAL FREQUENCY (kHz) | 8 | 4 | 4 | 4 | 8 | 4 | 4 | 4 | 8 |

FIG. 12

DRIVING MODE 2 (LOW-AFTERIMAGE MODE)

| | \multicolumn{13}{c}{FRAME NUMBER} |
|---|---|---|---|---|---|---|---|---|---|---|---|---|---|
| | 1 | 2 | 3 | 4 | 5 | 6 | 7 | 8 | 9 | 10 | 11 | 12 | 13 |
| TP | 0 | 0 | 0 | 0 | 1 | 1 | 1 | 1 | 0 | 0 | 0 | 0 | 0 |
| BB | 0 | 0 | 0 | 0 | 0 | 0 | 0 | 0 | 1 | 1 | 1 | 1 | 0 |
| BW | 0 | 0 | 0 | 0 | 0 | 0 | 0 | 0 | 0 | 0 | 0 | 0 | 0 |
| WB | 1 | 1 | 1 | 1 | 0 | 0 | 0 | 0 | 1 | 1 | 1 | 1 | 0 |
| WW | 1 | 1 | 1 | 1 | 0 | 0 | 0 | 0 | 0 | 0 | 0 | 0 | 0 |
| PHASE NUMBER | 0 | | | | 1 | | | | 2 | | | | 3 |
| INDEX NUMBER | 1 | | | | 1 | | | | 1 | | | | 0 |
| PHASE LENGTH | 4 | | | | 4 | | | | 4 | | | | 1 |
| PHASE TIME (ms) | 160 | | | | 160 | | | | 160 | | | | 40 |
| POWER SUPPLY CIRCUIT | ON | OFF | ON | OFF | ON | OFF | ON | OFF | ON | OFF | ON | OFF | ON |

FIG. 13

FIG. 17A  STEP 1 (WHITE DISPLAY PERIOD)

| | TG1 | TG2 | SIGNAL APPLIED TO PIXEL ELECTRODE | | S1 | S2 | POTENTIAL OF PIXEL ELECTRODE | DISPLAY |
|---|---|---|---|---|---|---|---|---|
| PIXEL GROUP A | ○ | × | S1 | | VH | | VH | WHITE |
| PIXEL GROUP B | × | ○ | S2 | | | OFF | OFF | BLACK (MAINTAIN) |

FIG. 17B  STEP 2 (BLACK DISPLAY PERIOD)

| | TG1 | TG2 | SIGNAL APPLIED TO PIXEL ELECTRODE | | S1 | S2 | POTENTIAL OF PIXEL ELECTRODE | DISPLAY |
|---|---|---|---|---|---|---|---|---|
| PIXEL GROUP A | ○ | × | S1 | | OFF | | OFF | WHITE (MAINTAIN) |
| PIXEL GROUP B | × | ○ | S2 | | | VL | VL | BLACK |

FIG. 18A STEP 2

| | TG1 | TG2 | SIGNAL APPLIED TO PIXEL ELECTRODE | |
|---|---|---|---|---|
| | | | S1 | S2 |
| PIXEL GROUP A | O | × | OFF | VL |
| PIXEL GROUP B | × | O | VL | — |

FIG. 18B IN THE CASE OF CHANGING TO DISPLAY STATE TO ALL-WHITE DISPLAY FROM STEP 2

| | TG1 | TG2 | SIGNAL APPLIED TO PIXEL ELECTRODE | | POTENTIAL OF PIXEL ELECTRODE | DISPLAY |
|---|---|---|---|---|---|---|
| | | | S1 | S2 | | |
| PIXEL GROUP A | O | × | OFF | VH | OFF | WHITE (MAINTAIN) |
| PIXEL GROUP B | × | O | | VH | VH | WHITE |

FIG. 18C IN THE CASE OF CHANGING TO DISPLAY STATE TO ALL-BLACK DISPLAY FROM STEP 2

| | TG1 | TG2 | SIGNAL APPLIED TO PIXEL ELECTRODE | | POTENTIAL OF PIXEL ELECTRODE | DISPLAY |
|---|---|---|---|---|---|---|
| | | | S1 | S2 | | |
| PIXEL GROUP A | O | × | VL | OFF | VL | BLACK |
| PIXEL GROUP B | × | O | | OFF | OFF | BLACK (MAINTAIN) |

INTEGRATED CIRCUIT DEVICE AND ELECTRONIC DEVICE

BACKGROUND

1. Technical Field

The present invention relates to integrated circuit devices that drive electro-optical panels such as an EPD (electrophoretic display) panel. Furthermore, the invention relates to electronic devices equipped with such integrated circuit devices together with electro-optical panels.

2. Related Art

Display devices that use EPD panels or the like and are also called electronic papers have been developed as display devices that achieve a further reduction in thickness and power consumption compared with liquid crystal display devices, plasma display devices, and the like, and are used in electronic devices such as wrist watches, electronic books, electronic newspapers, electronic advertisement boards, and guide display boards.

For example, in an EPD panel, an electrophoretic layer is arranged between a transparent top plane electrode provided in a surface layer and a plurality of segment electrodes provided in a lower layer. The electrophoretic layer includes microcapsules each containing white electrophoretic particles and black electrophoretic particles that are charged to have different polarities, and a dispersing medium (transparent oil etc.) for dispersing these electrophoretic particles.

By applying a voltage between the top plane electrode and the segment electrodes to apply an electric field to the electrophoretic particles, the electrophoretic particles move in accordance with the direction of the electric field, and colors of pixels corresponding to the segment electrodes are displayed. The EPD panel is nonvolatile (i.e., has a memory function). That is to say, when the electric field is applied to the electrophoretic particles once to achieve a display state, the EPD panel maintains this display state even if the electric field is thereafter not applied to the electrophoretic particles.

Accordingly, a driving voltage need only be applied to the EPD panel only when performing initial display and when changing or erasing the displayed content, and therefore, significant power-saving can be achieved. However, when changing the driving voltage, the power is necessary for driving capacitance components between the top plane electrode and the segment electrodes. In addition, since resistance components exist between the top plane electrode and the segment electrodes, a leakage current flows and power is consumed also in a time period in which a DC voltage is applied to the EPD panel.

As a related technique, JP-A-2009-237029 (paragraphs 0007-0008 and FIGS. 1 and 3) discloses that, in a display device which continues to display an image even if a display element is not driven, the time taken until the image is displayed is shortened and the power consumption in a driving device is reduced. This driving device includes a voltage boosting means for boosting the voltage of a power supply, a driving means for driving a display element group, a switch that turns on or off with a first end thereof connected to the voltage boosting means and a second end thereof connected to the driving means, and a control means for causing the switch to turn on from an off state while continuing to cause the voltage boosting means to boost the voltage to cause the driving means to drive the display element group with the boosted voltage, and switching the state of the switch so as to turn off from an on state after the driving ends.

According to JP-A-2009-237029, it is possible to reduce the power consumption after a driving period in which the driving means drives the display element group ends, by turning on the switch in the driving period and then turning off the switch after the driving period ends. However, JP-A-2009-237029 does not disclose a reduction in the power consumption in the driving period.

SUMMARY

An advantage of a first aspect of the invention lies in provision of an integrated circuit device that can reduce the power consumption when driving an electro-optical panel, while suppressing degradation in optical properties of the electro-optical panel. An advantage of a second aspect of the invention lies in provision of an electronic device or the like equipped with such an integrated circuit device together with an electro-optical panel.

To achieve at least a part of the above-described problem, an integrated circuit device according to one aspect of the invention is an integrated circuit device that drives an electro-optical panel using a driving waveform which is set in a plurality of phases, including: a driving voltage generation unit that operates as a result of receiving a supply of a power supply voltage generated by a power supply circuit, and generates a plurality of driving voltages to be applied to a plurality of electrodes in the electro-optical panel in each of a plurality of phases, in accordance with display data; and a power supply control unit that sets current supply capability of the power supply circuit to a first level synchronously with a timing of start of a phase, and sets the current supply capability of the power supply circuit to a second level, which is lower than the first level, after at least a predetermined time period has elapsed since the current supply capability of the power supply circuit was set to the first level.

According to this embodiment, the current supply capability of the power supply circuit is increased to the first level when changing the driving voltage applied to any of the electrodes in the electro-optical panel, and thereafter the current supply capability of the power supply circuit decreases to the second level. It is accordingly possible to reduce the power consumption at the time of driving the electro-optical panel, while suppressing degradation in optical properties of the electro-optical panel.

Here, the power supply control unit may set the current supply capability of the power supply circuit to the first level by operating the power supply circuit in a standard power mode, and set the current supply capability of the power supply circuit to the second level by operating the power supply circuit in a low power consumption mode or stopping an operation of the power supply circuit. In this case, the power consumption can be significantly reduced in a time period in which the driving voltage applied to the plurality of electrodes in the electro-optical panel is not changed.

Alternatively, the power supply control unit may set the current supply capability of the power supply circuit to the first level by operating the power supply circuit in a standard power mode, and set the current supply capability of the power supply circuit to the second level by alternately operating the power supply circuit in the standard power mode and in a low power consumption mode or intermittently operating the power supply circuit. In this case, a decrease of the power supply voltage can be recovered even if a leakage current flows through the plurality of electrodes in the electro-optical panel in a time period in which the current supply capability of the power supply circuit is maintained at the second level.

In the above-described configuration, the power supply control unit may set the current supply capability of the power supply circuit to the first level prior to a timing of start of a phase. With this configuration, the current supply capability of the power supply circuit can be sufficiently increased before the driving voltage generation unit generates the driving voltage.

Alternatively, the power supply control unit may determine the length of a time period in which the current supply capability of the power supply circuit is maintained at the first level or the second level, in accordance with a temperature measured by a temperature sensor. With this configuration, a change of the driving voltage in the second level period can be suppressed even in the case where the electro-optical panel to be driven has temperature characteristics, and a resistance value between the top plane electrode and the segment electrodes lowers (i.e., a leakage current increases) as the temperature increases.

Alternatively, the power supply control unit may determine the length of a time period in which the current supply capability of the power supply circuit is maintained at the first level or the second level, in accordance with the number of output terminals to which a driving voltage is applied that changes at a timing of start of a phase, or the total area of pixel electrodes connected to the output terminals in the electro-optical panel. With this configuration, the length of the time period in which the current supply capability of the power supply circuit is maintained at the first level or the second level can be appropriately determined based on the magnitude of the load on the power supply circuit.

Alternatively, the power supply control unit may determine the length of a time period in which the current supply capability of the power supply circuit is maintained at the first level or the second level, in accordance with the total length of a boundary line between adjoining pixel electrodes to which different driving voltages are applied in the electro-optical panel after a phase starts. With this configuration, the length of the time period in which the current supply capability of the power supply circuit is maintained at the first level or the second level can be appropriately determined while considering a leakage current between adjoining pixel electrodes to which different driving voltages are applied.

Alternatively, the integrated circuit device may further include a voltage monitoring unit that measures the power supply voltage generated by the power supply circuit, wherein the power supply control unit may change the current supply capability of the power supply circuit from the second level to the first level in a case where the power supply voltage becomes smaller than a predetermined voltage while the current supply capability of the power supply circuit is maintained at the second level. With this configuration, the power consumption can be reduced while maintaining a necessary driving voltage.

Alternatively, the power supply control unit may set the current supply capability of the power supply circuit to a third level, which is lower than or equal to the first level and higher than the second level, in a precharging period that is prior to a driving period in which the driving voltage is generated in a plurality of phases. With this configuration, a predetermined power supply voltage can be applied to the driving voltage generation unit from when a first frame starts.

Alternatively, in a case where a second predetermined time period has elapsed since the current supply capability of the power supply circuit was set to the second level, the power supply control unit may set the current supply capability of the power supply circuit to a third level, which is lower than or equal to the first level and higher than the second level, in a first precharging period that is prior to a driving period in which the driving voltage is generated in a plurality of phases, and in a case where the second predetermined time period has not elapsed since the current supply capability of the power supply circuit was set to the second level, the power supply control unit may set the current supply capability of the power supply circuit to the third level in a second precharging period, which is shorter than the first precharging period, or set the current supply capability of the power supply circuit to the first level at or after a timing of start of the driving period. With this configuration, it is possible to suppress the precharging time to the minimum and reduce the power consumption using charge stored in a capacitor in the previous driving period.

Alternatively, the integrated circuit device may further include a voltage monitoring unit that measures the power supply voltage generated by the power supply circuit, wherein in a case where the power supply voltage becomes smaller than a predetermined voltage while the current supply capability of the power supply circuit is maintained at the second level, the power supply control unit may set the current supply capability of the power supply circuit to a third level, which is lower than or equal to the first level and higher than the second level in a first precharging period that is prior to a driving period in which the driving voltage is generated in a plurality of phases, and in a case where the power supply voltage does not become smaller than the predetermined voltage, the power supply control unit may set the current supply capability of the power supply circuit to the third level in a second precharging period, which is shorter than the first precharging period, or set the current supply capability of the power supply circuit to the first period at or after a timing of start of the driving period. With this configuration, it is possible to suppress the precharging time to the minimum and reduce the power consumption using charge stored in a capacitor in the previous driving period.

In the above configuration, the integrated circuit device may further include a power supply circuit that boosts a power supply voltage supplied from the outside to generate a boosted power supply voltage by performing a charge-pump operation in accordance with a clock signal, wherein the power supply control unit may change the current supply capability of the power supply circuit by changing the frequency of the clock signal supplied to the power supply circuit, or controlling whether to supply the clock signal to the power supply circuit. With this configuration, the current supply capability of the power supply circuit can be easily changed.

An electronic device according to an aspect of the invention is an electronic device including: an electro-optical panel; and any of the above-described integrated circuit devices. With this configuration, it is possible to reduce the power consumption in the electronic device at the time of driving the electro-optical panel, while suppressing degradation in optical properties of the electro-optical panel.

Here, the electro-optical panel may be provided with a pixel circuit including: a pixel electrode opposed to a common electrode; a switching circuit connected to a data line; a holding circuit that holds image data supplied from the data line via the switching circuit; and a selector circuit that electrically connects selected one of a first control line and a second control line to the pixel electrode in accordance with the image data held by the holding circuit, and the power supply control unit may set current supply capability of the power supply circuit to a first level synchronously with a timing of a change of a potential applied to the first control line, the second control line, or the common electrode, and set the current supply capability of the power supply circuit to a second level, which is lower than the first level, after at least a predetermined time period has elapsed since the current supply capability of the power supply circuit was set to the first level.

With this configuration, the current supply capability of the power supply circuit is increased to the first level when changing the potential applied to the first control line, the second control line, or the common electrode in the electro-optical panel, and thereafter the current supply capability of the power supply circuit decreases to the second level. It is accordingly possible to reduce the power consumption at the time of driving the electro-optical panel, while suppressing degradation in optical properties of the electro-optical panel.

BRIEF DESCRIPTION OF THE DRAWINGS

The invention will be described with reference to the accompanying drawings, wherein like numbers reference like elements.

FIGS. 8A to 8C are diagrams showing exemplary settings of driving waveforms according to the first embodiment of the invention.

FIGS. 9A to 9C are diagrams showing exemplary settings of driving waveforms according to the first embodiment of the invention.

FIGS. 10A to 10C are diagrams showing exemplary settings of driving waveforms according to the first embodiment of the invention.

FIG. 12 is a diagram showing a second example of power supply control according to the first embodiment of the invention.

FIG. 13 is a diagram showing a third example of power supply control according to the first embodiment of the invention.

FIGS. 17A and 17B are diagrams showing states where display of some pixels is changed according to the second embodiment.

FIGS. 18A to 18C are diagrams showing states where display of all pixels is unified according to the second embodiment.

Figure 1:
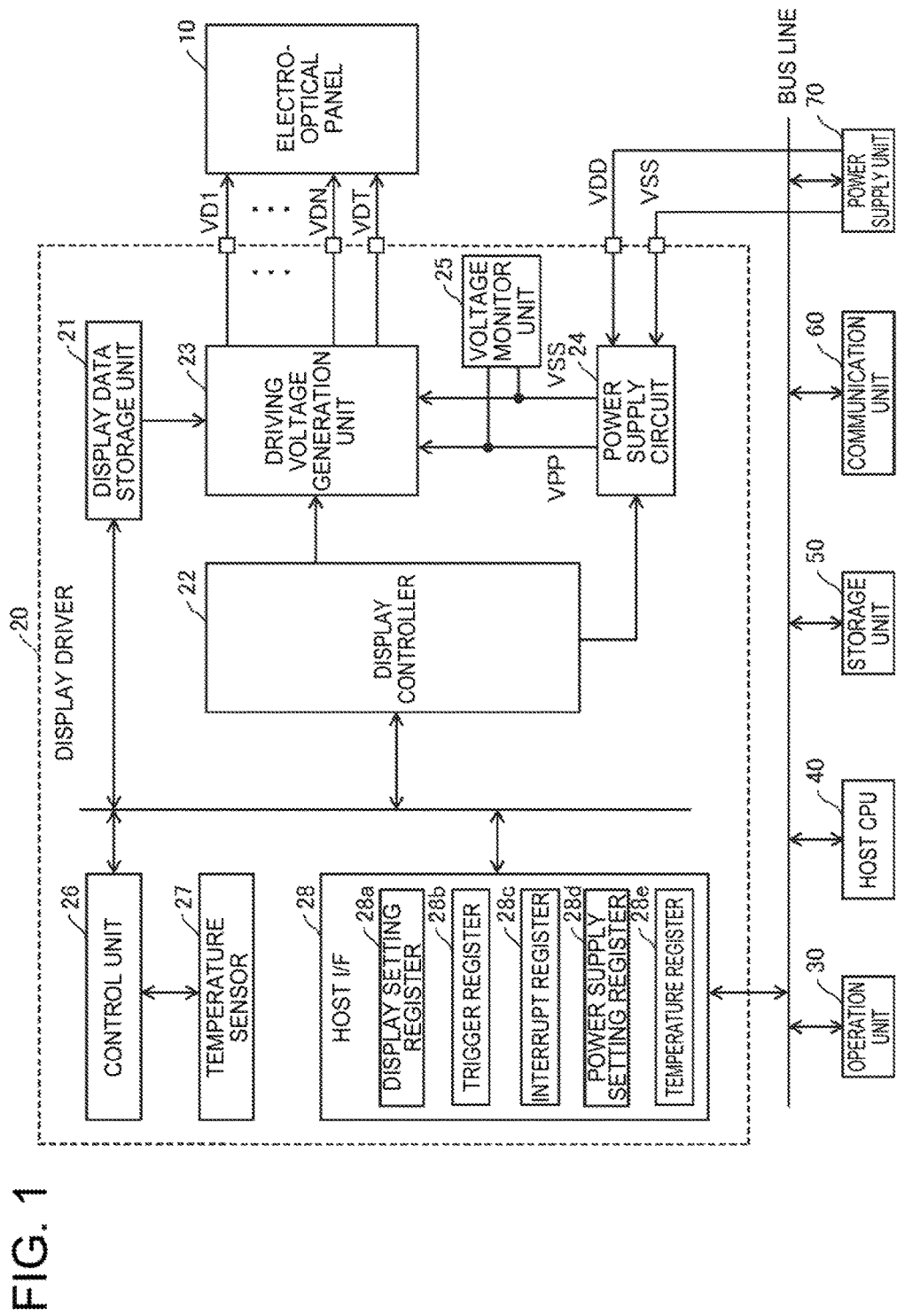
FIG. 1 is a block diagram showing an exemplary configuration of an electronic device according to a first embodiment of the invention.

DESCRIPTION OF EXEMPLARY
EMBODIMENTS

Hereinafter, embodiments of the invention will be described in detail with reference to the drawings. Note that the same constituent elements are assigned the same reference numerals to omit redundant descriptions.

Electronic Device

FIG. 1 is a block diagram showing an exemplary configuration of an electronic device according to a first embodiment of the invention. The invention can achieve various electronic devices, such as wrist watches, electronic books, electronic newspapers, electronic advertisement boards, guide display boards, electronic cards (credit cards, point cards etc.), remote controllers, mobile phones, mobile information terminals, and electronic calculators. FIG. 1 mainly shows a configuration with which such electronic devices display an image.

As shown in FIG. 1, this electronic device includes an electro-optical panel 10 such as an EPD (electrophoretic display) panel, a display driver 20, an operation unit 30, a host CPU (central processing unit) 40, a storage unit 50, a communication unit 60, and a power supply unit 70. The constituent elements from the display driver 20 to the power supply unit 70 are connected to one another by a bus line.

The display driver 20 drives the electro-optical panel 10 and causes the electro-optical panel 10 to display an image. The operation unit 30 includes an operation button or the like, and is used to input various commands and information by a user, for example. The host CPU 40 controls each part of the electronic device. The storage unit 50 includes a memory such as an EEPROM, a hard disk, or the like as a storage medium, and stores various kinds of information, for example. The communication unit 60 is constituted by an analog circuit and a digital circuit, and communicates with an external device, for example. The power supply unit 70 is constituted by an analog circuit, and supplies a power supply voltage to each part of the electronic device, for example.

Here, the storage unit 50 stores software for causing the host CPU 40 to perform various kind of processing. The storage unit 50 also stores timing information for setting a time period (driving voltage application period) for applying each driving voltage to the electro-optical panel 10. Furthermore, the storage unit 50 stores waveform information related to at least a set of driving voltage waveforms (also referred to simply as "driving waveforms" in this application) in a time period in which the display state of the electro-optical panel 10 switches from a first display state, which corresponds to first display data, to a second display state, which corresponds to second display data.

The storage unit 50 stores power supply control information or the like for controlling the operation level of the power supply circuit 24 of the display driver 20. The host CPU 40 supplies, to the display driver 20, the timing information, the waveform information, and the power supply control information that are stored in the storage unit 50, as well as the display data obtained by the communication unit 60 or the like.

Electro-Optical Panel

An EPD panel is typically used as the electro-optical panel 10, but an electro-optical panel that is other than the EPD panel and in which the display state is controlled by driving voltage application time can also be used.

For example, an ECD (electrochromic display) panel can be used as the electro-optical panel 10. The ECD panel has elements whose color is changed by an electric field, and performs display using a phenomenon in which, upon applying a voltage between a top plane electrode and segment electrodes, elements are colored or the light transmittance of the elements is changed, for example, by an oxidation-reduction reaction.

Alternatively, an NCD (nanochromics display) panel may be used as the electro-optical panel 10. Other options that may be used as the electro-optical panel 10 include a quick response liquid powder display (QR-LPD (registered trademark)) panel, a panel using cholesteric liquid crystal, a panel using chiral nematic liquid crystal, an electrowetting panel, and the like.

Figure 2:
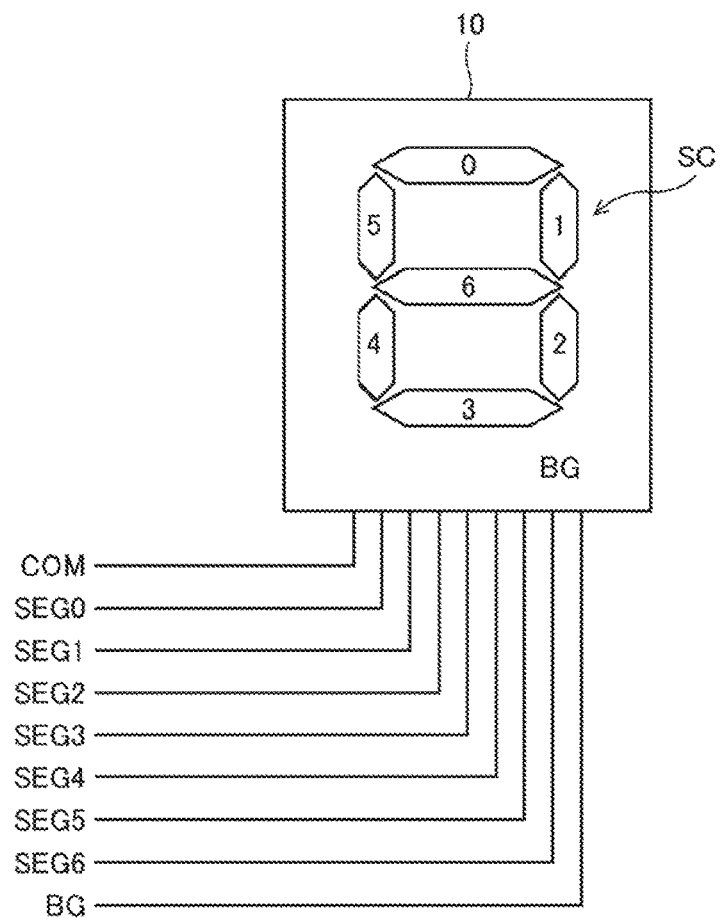
FIG. 2 is a plan view showing an EPD panel as an exemplary electro-optical panel.

FIG. 2 is a plan view showing an EPD panel as an exemplary electro-optical panel. While there are two types of EPD panels, namely a segment type and a dot-matrix type, this embodiment will describe an EPD panel of the segment type as an example.

In the example shown in FIG. 2, the electro-optical panel 10 displays a character such as a number. The electro-optical panel 10 has a display body indicating a segment character SC that is constituted by seven segments, namely segments 0 to 6, and displays a single-digit number. A region BG around these segments 0 to 6 shows a background region of the segment character SC.

In this case, the electro-optical panel 10 has a single common top plane electrode COM, seven segment electrodes that are segment electrodes SEG0 to SEG6, and a single backplane electrode BG. Nine lines extending from below the electro-optical panel 10 are lead wires connected to these electrodes, and are connected to the display driver 20 shown in FIG. 1. The following description assumes that the backplane electrode BG is also a kind of a segment electrode and corresponds to a pixel electrode.

Figure 3:
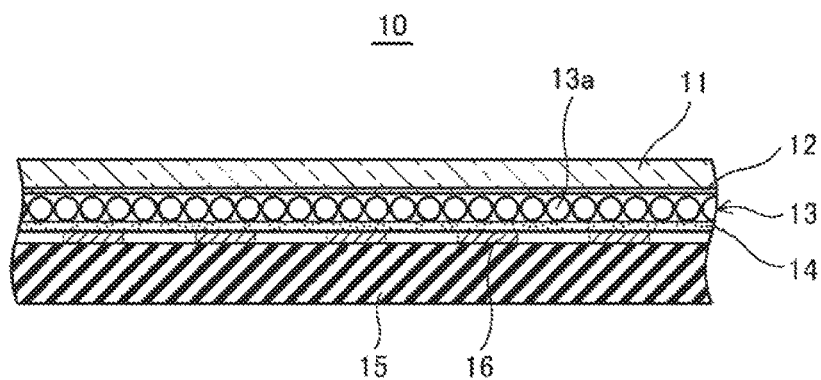
FIG. 3 is a cross-sectional view schematically showing a part of the EPD panel as an exemplary electro-optical panel.

FIG. 3 is a cross-sectional view schematically showing a part of the EPD panel as an exemplary electro-optical panel. As shown in FIG. 3, a transparent top plane electrode 12, such as an ITO (indium tin oxide) film, is formed over the entire back face of a transparent resin substrate 11, which serves as a display surface, and an electrophoretic layer 13 is formed in a film-like shape in a layer below the top plane electrode 12. The film-like electrophoretic layer 13 is adhered, by an adhesion layer 14, onto a flexible printed circuit board 15 with segment electrodes 16 formed on a surface thereof for respective pixels, and the electro-optical panel 10 is thereby configured.

In the electrophoretic layer 13, a large number of minute microcapsules 13a having a diameter of about several dozen micrometers are arranged in a dispersed manner in a binder, a surfactant, a thickener, pure water, or the like, or a mixture of these materials. Each microcapsule 13a is a capsule shell made of transparent methacrylate resin or the like in which black particles made of carbon black or the like and white particles made of titanium oxide or the like are encapsulated in a state of being dispersed in a transparent dispersing medium having a high viscosity, such as silicone oil. For example, the black particles are positively charged, and the white particles are negatively charged.

Upon applying a voltage between the top plane electrode 12 and each segment electrode 16, electrostatic force is exerted on the positively charged black particles and the negatively charged white particles encapsulated in the microcapsule 13a in respective directions corresponding to the positive and negative charging. For example, when the potential of the segment electrode 16 is higher than that of the top plane electrode 12, the positively charged black particles move to the side of the top plane electrode 12, and the corresponding pixel displays black color. On the other hand, when the potential of the segment electrode 16 is lower than that of the top plane electrode 12, the negatively charged white particles move to the side of the top plane electrode 12, and the corresponding pixel displays white color.

At this time, the black particles and the white particles move in the dispersing medium by means of electrophoresis. Here, the electro-optical panel 10 is nonvolatile (i.e., has a memory function) and holds the display state even if the potentials of the top plane electrode 12 and the segment electrode 16 are made the same after applying a voltage between the top plane electrode 12 and the segment electrode 16 to change the display state. Accordingly, a driving voltage need only be applied to the electro-optical panel 10 only when changing display of the electro-optical panel 10, and therefore, the power consumption is very small.

To drive the electro-optical panel 10, the potential of the segment electrode 16 may be changed while fixing the potential of the top plane electrode 12. In this case, for example, the potential of the top plane electrode 12 is fixed to 0 V, a positive driving voltage is applied to the segment electrode 16 of a pixel whose display state is to be changed from white display to black display, a negative driving voltage is applied to the segment electrode 16 of a pixel whose display state is to be changed from black display to white display, and a driving voltage of 0 V is applied to the segment electrode 16 of a pixel whose display state is not to be changed.

Alternatively, both the potential of the top plane electrode 12 and the potential of the segment electrode 16 may be changed. In this case, for example, while applying a driving voltage of 0 V to the top plane electrode 12, a positive driving voltage is applied to the segment electrode 16 of a pixel whose display state is to be changed from white display to black display, and a driving voltage of 0 V is applied to the segment electrode 16 of a pixel whose display state is not to be changed. While applying a positive driving voltage to the top plane electrode 12, a driving voltage of 0 V is applied to the segment electrode 16 of a pixel whose display state is to be changed from black display to white display, and the same driving voltage as that of the top plane electrode 12 is applied to the segment electrode 16 of a pixel whose display state is not to be changed. The latter case will be described below.

In the electro-optical panel 10, it is favorable to stabilize the display state by changing the voltages applied between all segment electrodes 16 and the top plane electrode 12 in accordance with predetermined driving waveforms in a time period in which the display state (gradation) of a single segment electrode switches from the first display state corresponding to the first display data to the second display state corresponding to the second display data. For this purpose, the display driver 20 drives the electro-optical panel 10 using driving waveforms that are set in a plurality of phases.

Here, "phase" means a time period in which a driving voltage is constant in the driving waveforms in the electro-optical panel 10. In other words, "phase" means a time period in which a waveform value is constant. Note that a voltage change caused by leakage in a time period from when the power supply circuit is stopped until when the power supply circuit is resumed is deemed to be within a range of "a constant driving voltage". "Phase length", which is the length of a phase, indicates the number of cycles of a display timing clock signal. For example, in the case where the phase length is "4", it indicates four cycles of the display timing clock signal. Note that a single cycle of the display timing clock signal corresponds to the time of a single frame.

Display Driver

Referring to FIG. 1 again, the display driver 20 includes a display data storage unit 21, a display controller 22, a driving voltage generation unit 23, a power supply circuit 24, a voltage monitoring unit 25, a control unit 26, a temperature sensor 27, and a host interface (I/F) 28. The display data storage unit 21, the display controller 22, the control unit 26, and the host interface 28 are connected to one another by a bus line. An integrated circuit device (e.g., a display driver IC) according to the first embodiment of the invention includes the display data storage unit 21, the display controller 22, and the driving voltage generation unit 23, and may further include at least some of the power supply circuit 24, the voltage monitoring unit 25, the control unit 26, the temperature sensor 27, and the host interface 28.

The display data storage unit 21 stores display data supplied from the host CPU 40 via the host interface 28. The display controller 22 is constituted by a digital circuit and an analog circuit, for example, sets driving waveforms in a plurality of phases based on the timing information, the waveform information, and the power supply control information that are supplied from the host CPU 40 via the host interface 28, and controls the power supply circuit 24.

For this purpose, the display controller 22 generates the display timing clock signal and also generates a display start trigger signal based on a display start command transmitted from the host CPU 40, and activates a display start flag synchronously with the display timing clock signal. Furthermore, the display controller 22 sequentially selects a set of waveform values to set driving waveforms when the display start flag is activate. The display controller 22 thereby supplies the set of waveform values that indicate a set of driving voltages to the driving voltage generation unit 23 in each phase in a time period in which the display state of the electro-optical panel 10 is switched from the first display state to the second display state.

The driving voltage generation unit 23 operates as a result of receiving a supply of a power supply voltage generated by the power supply circuit 24, and generates a plurality of driving voltages to be applied to the plurality of electrodes in the electro-optical panel 10 in each of the plurality of phases, in accordance with the display data stored in the display data storage unit 21. The driving voltage generation unit 23 has a circuit having multiple channels corresponding to the plurality of segment electrodes in the electro-optical panel 10, and selects a single waveform value for each channel from the set of waveform values supplied from the display controller 22, in accordance with the display data. The driving voltage generation unit 23 thereby generates driving voltages VD1 to VDN to be supplied to N (N≥2) segment electrodes in the electro-optical panel 10, and in the case of performing binary driving on the electro-optical panel 10, a driving voltage VDT to be supplied to the top plane electrode in the electro-optical panel 10 is generated.

The power supply circuit 24 generates a power supply voltage to be used by the driving voltage generation unit 23, based on the power supply voltage supplied from the power supply unit 70. For example, in the case of performing binary driving at 0 V and 15 V on the electro-optical panel 10, the power supply circuit 24 boosts a power supply voltages (VDD-VSS) represented by a power supply potential VDD (e.g., 1.8 V to 5.5 V) and a power supply potential VSS (e.g., 0 V) that are supplied from the power supply unit 70, and thereby generates a boosted power supply voltage (VPP-VSS) of 15 V.

The voltage monitoring unit 25 includes a comparator, an ADC (analog/digital convertor), or the like, for example, measures the power supply voltage (VPP-VSS) generated by the power supply circuit 24, and outputs a measurement result to the power supply control unit 226.

The control unit 26 is constituted by a digital circuit, for example, and controls each part of the display driver 20. In the case where the control unit 26 includes a CPU (central processing unit), the integrated circuit device that includes the control unit 26 may be configured as an MCU (microcontroller unit).

The temperature sensor 27 includes a PN junction diode or a thermocouple, and an ADC, for example, and measures the temperature of or around the electro-optical panel 10 under the control of the control unit 26. This is because display properties of the electro-optical panel 10 changes due to the temperature. The temperature sensor 27 can be attached to the back face of the flexible printed circuit board 15 (FIG. 3). At least a part of the temperature sensor 27 may be embedded in the electrophoretic layer 13 (FIG. 3) or arranged adjacent to the electrophoretic layer 13.

The host interface 28 is constituted by a digital circuit, for example, and performs interface processing between the display driver 20 and the host CPU 40. The host interface 28 has control registers such as a display setting register 28a, a trigger register 28b, an interrupt register 28c, a power supply setting register 28d, and a temperature register 28e. The host CPU 40 can access these control registers to store the control information in these control registers and read out the control information and measurement information from these control registers.

The display setting register 28a stores an instruction to set the clock signal and the display timing clock signal generated by the display controller 22, an instruction to perform reverse display, all-black display, or all-white display on the electro-optical panel 10, or the like. The trigger register 28b stores a display start trigger signal for starting a driving waveform generation operation.

The interrupt register 28c stores an interrupt flag and an interrupt mask that are generated after the driving waveform generation operation ends. The power supply setting register 28d stores various kinds of control information used in the setting of an operation level of the power supply circuit 24, the setting of a constant-voltage circuit (regulator), the setting of a voltage boosting factor, fine adjustment (contrast and trimming) of the boosted voltage, or the like. The temperature register 28e stores data indicating a result of the measurement performed by the temperature sensor 27.

First Embodiment

Figure 4:
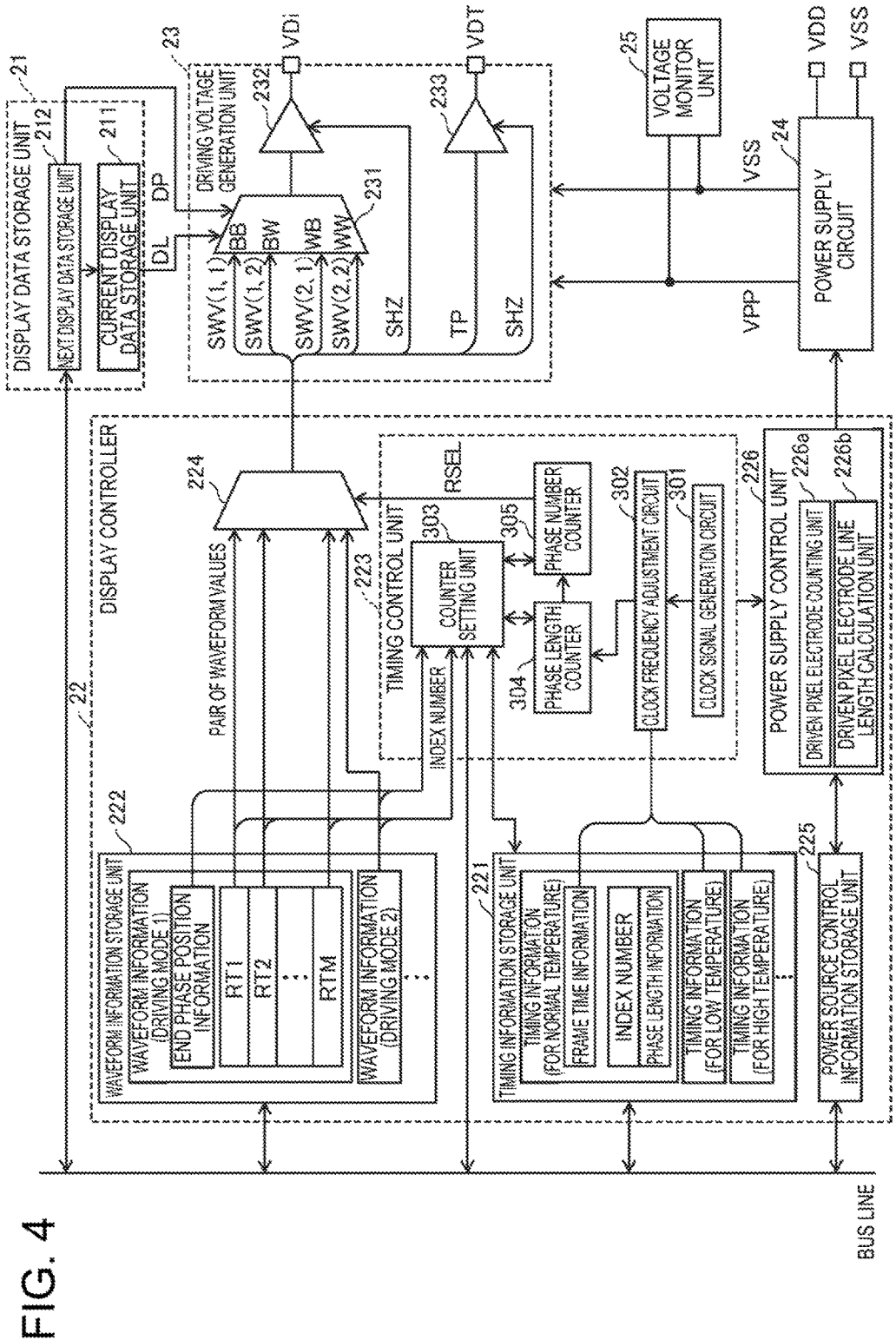
FIG. 4 is a diagram showing a part of a configuration of a display driver according to the first embodiment of the invention.

FIG. 4 is a diagram showing details of a part of a configuration of the display driver according to the first embodiment of the invention. FIG. 4 shows the display data storage unit 21, the display controller 22, the driving voltage generation unit 23, the power supply circuit 24, and the voltage monitoring unit 25.

The display data storage unit 21 is constituted by a register including a plurality of flip-flops or the like, or a memory such as an SRAM, for example. The display data storage unit 21 may include a present display data storage unit 211 that stores first display data (present display data) DL supplied from the host CPU 40 (FIG. 1), and a next display data storage unit 212 that stores second display data (next display data) DP to be supplied subsequent to the first display data DL.

For example, in the case where the display driver 20 outputs 256 driving voltages to 256 segment electrodes in the electro-optical panel, display data including 256 sets of segment display data is supplied to the next display data storage unit 212. When new display data is supplied, the display data storage unit 21 updates the first display data DL and the second display data DP.

The display controller 22 includes a timing information storage unit 221, a waveform information storage unit 222, a timing control unit 223, a driving waveform selection unit 224, a power supply control information storage unit 225, and a power supply control unit 226.

The timing information storage unit 221, the waveform information storage unit 222, and the power supply control information storage unit 225 are constituted by nonvolatile memories, registers, or the like, and these units may be integrally configured. The timing information storage unit 221, the waveform information storage unit 222, and the power supply control information storage unit 225 store the timing information, the waveform information, and the power supply control information, respectively, that are supplied from the host CPU 40 (FIG. 1), for example.

The timing information storage unit 221 stores phase length information, which indicates the length of a phase in which a constant driving voltage is applied to the electro-optical panel, so as to correspond to an index number. Here, the timing information storage unit 221 may store a single type of timing information including the index number and the phase length information.

Alternatively, as shown in FIG. 4, the timing information storage unit 221 may store a plurality of types of timing information (e.g., for ordinary temperature, for low temperature, and for high temperature) used under a plurality of different environmental conditions. In this case, even if the environmental conditions change, the host CPU 40 does not need to re-transmit the timing information to the display controller 22.

Furthermore, the timing information storage unit 221 may store frame time information, which indicates the time of a single frame. The frame time information is supplied from the host CPU 40 (FIG. 1), for example. Combinations of the frame time information and the phase length information enable flexible settings of the driving waveforms in accordance with the temperature. Alternatively, the driving waveforms can also be changed in accordance with the environmental conditions by changing only the frame time information.

In the case where the waveform information does not need to be changed even if the environmental conditions change, the host CPU 40 can interrupt a transmission operation after transmitting the frame time information or the index number and the phase length information to the display controller 22 to change the settings. It is thereby possible to change the driving waveforms in association with the change of the environmental conditions through minimum rewriting of data, without transmitting the waveform information.

The waveform information storage unit 222 stores the waveform information related to at least a set of driving waveforms used in accordance with at least a single display state determined by the display data. Here, "at least a single display state" may be a display state corresponding to the first display data DL and the second display data DP, or may be a display state corresponding to the second display data DP. In the driving voltage generation unit 23, a single driving waveform is selected from the set of driving waveforms in accordance with the actually supplied display data.

"At least a set of driving waveforms" may be a set of driving waveforms in a single driving mode, or may include a set of driving waveforms in a driving mode 1 and a set of driving waveforms in a drive mode 2 as shown in FIG. 4. For example, the driving mode 1 is a high-speed mode in which the time taken for a change from the display state corresponding to the first display data DL to the display state corresponding to the second display data DP is shorter than in the driving mode 2, and the driving mode 2 is a low-afterimage mode in which the amount of afterimage is small, i.e., high-quality rewriting is performed, although the rewriting speed is lower than in the driving mode 1. As a result of the driving mode being designated by the host CPU 40 (FIG. 1) or the like, a single driving mode is selected from among the plurality of driving modes.

The waveform information storage unit 222 has storage areas RT1 to RTM that respectively store the waveform information for periods T1 to TM corresponding to the plurality of phases, for each driving mode. The waveform information of each phase for a single driving mode includes a set of waveform values indicating a set of driving voltages, and the index number that specifies the phase length.

Information for stopping generation of the driving waveforms may be included in the waveform information of each phase. Alternatively, as shown in FIG. 4, the waveform information storage unit 222 may store end phase position information, which specifies the position of the phase in which application of the driving voltage ends, at the top of the storage area that stores the waveform information related to a set of driving waveforms.

With the latter configuration, it is unnecessary to store a bit indicating the end position of the driving waveform (e.g., a bit indicating whether or not the phase is the last phase) in a storage area for storing the waveform information of each phase, and accordingly, the volume of the date to be stored in the waveform information storage unit 222 can be reduced.

In addition, the host CPU 40 (FIG. 1) no longer needs to transmit the waveform information of phases after the end phase after transmitting only the end phase position information and the waveform information of a necessary phase to the display controller 22 to configure a setting, and accordingly, the traffic and the load can be reduced by interrupting a transmission operation.

Meanwhile, the display controller 22 can also interrupt a receiving operation at the time point of receiving the waveform information of the necessary phase based on the end phase position information. For example, in the case where the end phase position information indicates a 5th phase, the display controller 22 can disable a receiving circuit at the time point of finishing reception of the waveform information of the 5th phase, and accordingly, the power consumption by the display controller 22 can be lowered.

The timing control unit 223 reads out the index number included for each phase in the waveform information stored in the waveform information storage unit 222, reads out the phase length information corresponding to this index number from the timing information storage unit 221, and counts the number of cycles of the display timing clock signal in accordance with this phase length information, thereby sequentially generating a selection signal RSEL in the driving voltage application period corresponding to a plurality of phases.

In the case where a plurality of types of timing information are stored in the timing information storage unit 221, the control unit 26 shown in FIG. 1 selects a single type of timing information from the plurality of types of timing information stored in the timing information storage unit 221 in accordance with the temperature measured by the temperature sensor 27. It is thereby possible to change the driving waveforms in the electro-optical panel so as to automatically correspond to a change of the environmental conditions, independently of instructions of the host CPU 40 or the like.

For example, the timing control unit 223 includes a clock signal generation circuit 301, a clock frequency adjustment circuit 302, a counter setting unit 303, a phase length counter 304, and a phase number counter 305. The clock signal generation circuit 301 is constituted by a crystal oscillator or the like, and generates a clock signal.

The clock frequency adjustment circuit 302 is constituted by a PLL circuit, a frequency division circuit, or the like, and generates a display timing clock signal based on the clock signal generated by the clock signal generation circuit 301. In the case where the frame time information is stored in the timing information storage unit 221, the clock frequency adjustment circuit 302 can adjust the frequency of the display timing clock signal in accordance with the frame time information.

The counter setting unit 303 reads out the end phase position information included in the waveform information stored in the waveform information storage unit 222, and sets, in the phase number counter 305, the phase number at the position specified by the end phase position information. The counter setting unit 303 also reads out the index number included for each phase in the waveform information stored in the waveform information storage unit 222, reads out the phase length information corresponding to this index number from the timing information storage unit 221, and sets the phase length indicated by this phase length information in the phase length counter 304. When starting to update the display, the counter setting unit 303 starts the counting operation of the phase length counter 304 and the phase number counter 305.

The phase length counter 304 increments the count value by counting the number of cycles of the display timing clock signal, and activates the output signal when the count value becomes equal to the phase length set by the counter setting unit 303. Here, the time period from when the phase length counter 304 starts the counting operation until when it activates the output signal indicates the phase time corresponding to this phase.

Upon the phase length counter 304 activating the output signal, the counter setting unit 303 once resets the count value of the phase length counter 304 to set the count value to zero and deactivate the output signal. Thereafter, the counter setting unit 303 sets the phase length of the next phase in the phase length counter 304, and the phase length counter 304 starts to count the number of cycles of the display timing clock signal in the next phase.

The phase number counter 305 counts the number of times that the output signal of the phase length counter 304 is activated and thereby increments the count value, and outputs the count value indicating the phase number as the selection signal RSEL in the driving voltage application period corresponding to a plurality of phases.

When the count value of the phase number counter 305 exceeds the phase number set by the counter setting unit 303, the counter setting unit 303 once resets the count value of the phase number counter 305 to set the count value to zero. The timing control unit 223 can thereby stop generation of the selection signal RSEL after generating the selection signal RSEL in the driving voltage application period corresponding to the phase at the position specified by the end phase position information stored in the waveform information storage unit 222. The timing control unit 223 outputs the selection signal RSEL to the driving waveform selection unit 224, and outputs the clock signal, the selection signal RSEL, and the like to the power supply control unit 226.

The driving waveform selection unit 224 selects a set of waveform values indicating a set of driving voltages from the waveform information stored in the storage areas RT1 to RTM in the waveform information storage unit 222, in accordance with the selection signal RSEL that is sequentially generated by the timing control unit 223.

In the case where the waveform information storage unit 222 stores the waveform information regarding a plurality of sets of driving waveforms in association with a plurality of driving modes as shown in FIG. 4, the driving waveform selection unit 224 selects a set of waveform values indicating a set of driving voltages from the waveform information regarding a set of driving waveforms corresponding to the driving mode specified by the host CPU 40 (FIG. 1) or the like, in accordance with the selection signal RSEL. In this case, the phase length that is set based on the index number can be used in common in a plurality of driving modes, and it is accordingly unnecessary to provide a storage area for the phase length information for each driving mode, and the data area in the integrated circuit device can be reduced.

The driving waveform selection unit 224 selects a set of waveform values stored in the storage area RT1 in order to use this set of waveform values in the driving in the time period T1, and then selects a set of waveform values stored in the storage area RT2 in order to use this set of waveform values in the driving in the time period T2, in accordance with the selection signal RSEL. The same applies to the time periods T3 to TM.

Thus, the driving waveform selection unit 224 outputs a set of driving waveform signals indicating a set of driving waveforms in a time period in which the display state of pixels of the electro-optical panel switches from the first display state to the second display state. For example, the driving waveform selection unit 224 generates segment signals SWV (1, 1) to SWV (L, L), and a top plane signal TP. Here, L denotes the number of gray levels of the display data, and is an integer that is 2 or larger. The following description will take the case where L=2 as an example.

In the case where the number of gray levels of the display data is 2, the first display state corresponding to the first display data DL is one of two states, namely black display and white display, and the second display state corresponding to the second display data DP is one of two states, namely black display and white display. The segment signal SWV (1, 1) indicates a driving waveform to be supplied to the segment electrode when both the first and second display states are black display. The segment signal SWV (1, 2)

indicates a driving waveform to be supplied to the segment electrode when the first display state is black display and the second display state is white display.

Similarly, the segment signal SWV (2, 1) indicates a driving waveform to be supplied to the segment electrode when the first display state is white display and the second display state is black display. The segment signal SWV (2, 2) indicates a driving waveform to be supplied to the segment electrode when both the first and second display states are white display. The top plane signal TP indicates a driving waveform to be supplied to the top plane electrode.

Furthermore, the set of waveform values that are output from the driving waveform selection unit 224 may include a waveform value for setting the output terminal of the driving voltage generation unit 23 to a floating state (high-impedance state). When setting the output terminal of the driving voltage generation unit 23 to the floating state in a kth period Tk ($1 \leq k \leq M$), a floating state setting bit in the kth waveform value is set to "1". A floating state setting signal SHZ is thereby activated in the time period Tk.

Thus, on/off control of the driving of the plurality of segment electrodes and the top plane electrode in the electro-optical panel is enabled. This on/off control function is provided because there are cases where not only a specific driving voltage but also the floating state are needed in the process of a driving sequence, depending on the type of the electro-optical panel.

The driving voltage generation unit 23 selects a single waveform values from the waveform values of the segment signals SWV (1, 1) to SWV (2, 2) that are supplied from the driving waveform selection unit 224, based on the first display data DL and the second display data DP supplied from the display data storage unit 21, and generates, based on the selected waveform value, a driving voltage VDi to be supplied to an ith segment electrode in the electro-optical panel. The driving voltage generation unit 23 also generates the driving voltage VDT to be supplied to the top plane electrode in the electro-optical panel, based on the waveform value of the top plane signal TP supplied from the driving waveform selection unit 224.

The driving voltage generation unit 23 includes a selector 231 and a driving circuit 232 in a circuit for a single channel for driving each segment electrode. The driving voltage generation unit 23 also includes a driving circuit 233 in a circuit for driving the top plane electrode. The driving circuits 232 and 233 are each constituted by an analog circuit, for example.

The selector 231 selects a single waveform value from the set of waveform values supplied from the driving waveform selection unit 224, based on the first display data DL and the second display data DP supplied from the display data storage unit 21, and outputs the selected waveform value to the driving circuit 232. The driving circuit 232 shifts the level of the waveform value to generate the driving voltage VDi using the power supply voltage (VPP-VSS) supplied from the power supply circuit 24.

The driving circuit 232 can also set the output terminal to the floating state in accordance with the floating state setting signal SHZ. The driving circuit 232 outputs the driving voltage VDi from the output terminal when the floating state setting signal SHZ is not active, and sets the output terminal to the floating state when the floating state setting signal SHZ is activate.

The driving circuit 233 shifts the level of the waveform value supplied from the driving waveform selection unit 224 to generate the driving voltage VDT using the power supply voltage (VPP-VSS) supplied from the power supply circuit 24. The driving circuit 233 can also set the output terminal to the floating state in accordance with the floating state setting signal SHZ. The driving circuit 233 outputs the driving voltage VDT from the output terminal when the floating state setting signal SHZ is not active, and sets the output terminal to the floating state when the floating state setting signal SHZ is activated.

The power supply circuit 24 may include a voltage boosting circuit such as a charge pump circuit, for example, or may include an op-amp, a regulator, or the like in addition to or in place of the voltage boosting circuit. The power supply control unit 226 may change current supply capability of the power supply circuit 24 by changing the frequency of a voltage boosting clock signal supplied to the voltage boosting circuit in the power supply circuit 24, or controlling whether to supply the voltage boosting clock signal to the voltage boosting circuit. The current supply capability of the power supply circuit 24 can thereby be easily changed.

Alternatively, the power supply control unit 226 may change the current supply capability of the power supply circuit 24 by performing on/off control or shut-down control on the power supply to the op-amp or the regulator of the power supply circuit 24. Also, the power supply control unit 226 may change the current supply capability of the power supply circuit 24 by changing the amount of a constant current that flows through a differential amplification stage in the op-amp or the regulator. Alternatively, the power supply control unit 226 may change the current supply capability of the power supply circuit 24 by activating or deactivating an enable signal supplied to the power supply circuit 24.

Figure 5:
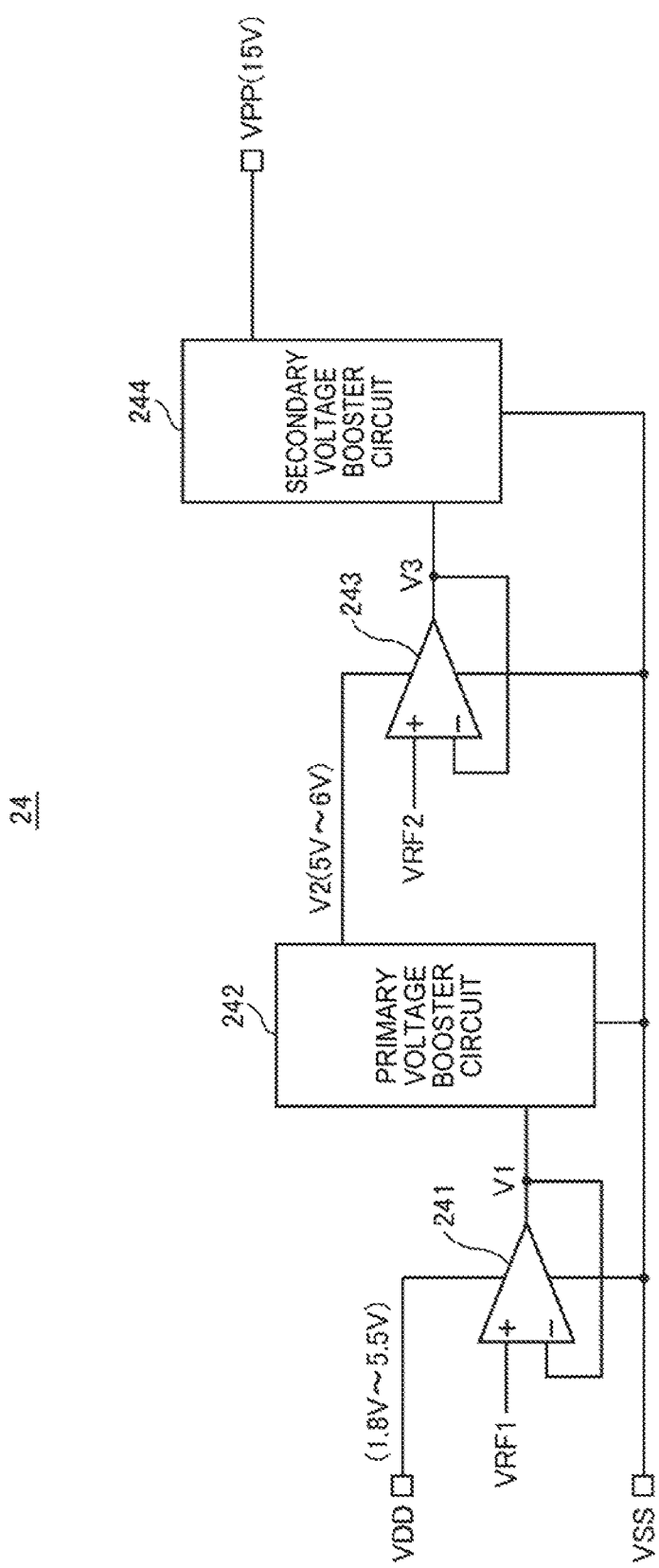
FIG. 5 is a diagram showing an exemplary configuration of a power supply circuit shown in FIG. 4.

FIG. 5 is a diagram showing an exemplary configuration of the power supply circuit shown in FIG. 4. As shown in FIG. 5, the power supply circuit 24 includes a first regulator 241, a primary voltage boosting circuit 242, a second regulator 243, and a secondary voltage boosting circuit 244.

For example, in the case of performing binary driving at 0 V and 15 V on the electro-optical panel, the first regulator 241, to which the power supply potential VDD (e.g., 1.8 V to 5.5 V) and the power supply potential VSS (0 V) are supplied, generates a stabilized power supply potential V1 based on a reference potential VRF1. Also, the primary voltage boosting circuit 242 boosts the stabilized power supply potential V1 with respect to the power supply potential VSS to generate a voltage boosting power supply potential V2 (e.g., 5 V to 6 V).

Furthermore, the second regulator 243, to which the voltage boosting power supply potential V2 and the power supply potential VSS are supplied, generates a stabilized power supply potential V3 based on a reference potential VRF2. Also, the secondary voltage boosting circuit 244 boosts the stabilized power supply potential V3 with respect to the power supply potential VSS to generate a voltage boosting power supply potential VPP (15 V). Note that, in the case where the power supply potential VDD is sufficiently high, the primary voltage boosting circuit 242 may be bypassed, and the output of the first regulator 241 may be directly supplied to the secondary regulator 243.

Figure 6:
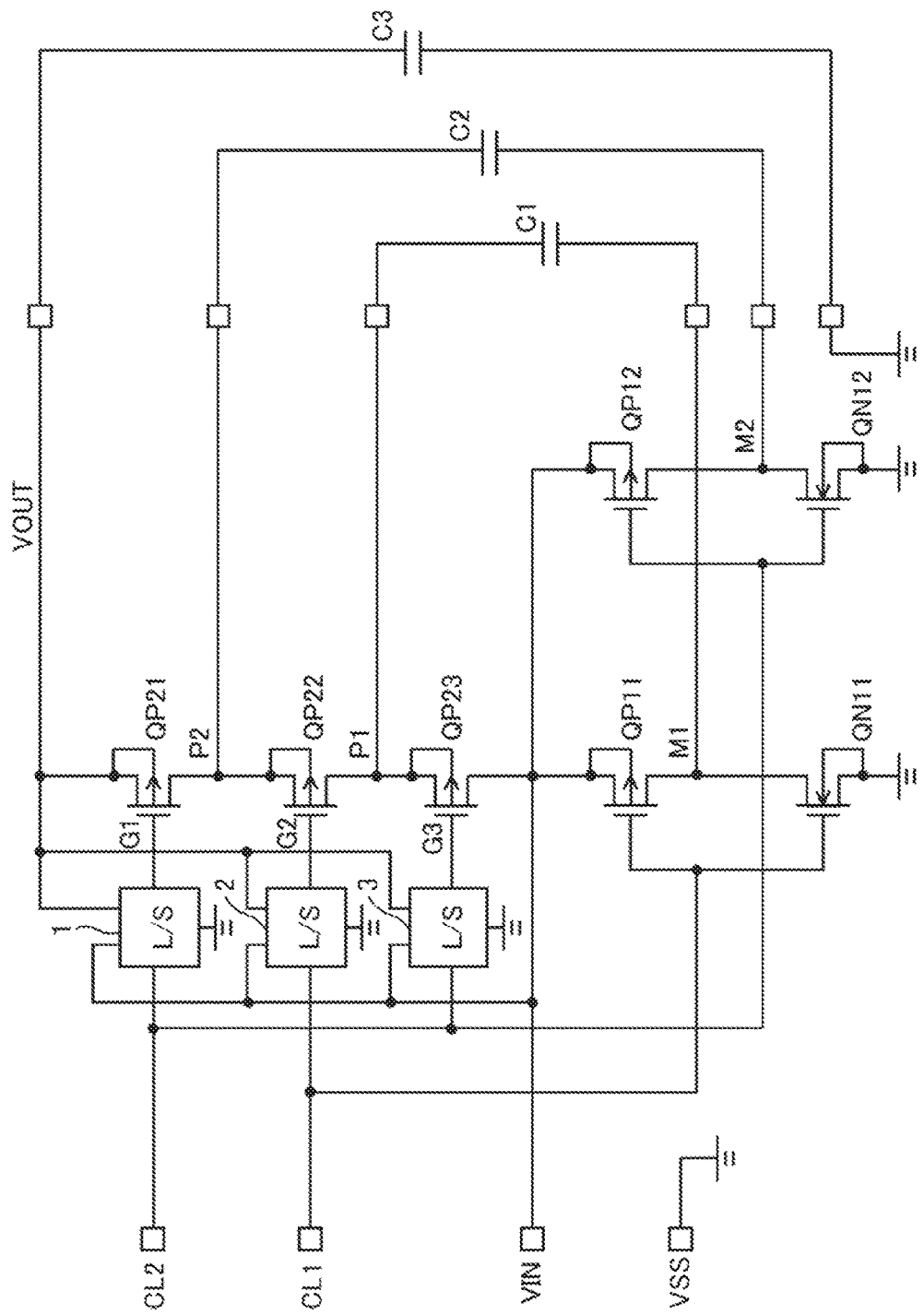
FIG. 6 is a circuit diagram showing an exemplary configuration of a primary voltage boosting circuit or a secondary voltage boosting circuit shown in FIG. 5.

FIG. 6 is a circuit diagram showing an exemplary configuration of the primary voltage boosting circuit or the secondary voltage boosting circuit shown in FIG. 5. This voltage boosting circuit can be used as the primary voltage boosting circuit 242 and also as the secondary voltage boosting circuit 244 shown in FIG. 5. The voltage boosting circuit shown in FIG. 6 boosts an input power supply potential VIN by performing a charge-pump operation in accordance with voltage boosting clock signals CL1 and CL2 supplied from the power supply control unit 226 (FIG. 4), and generates a boosted output power supply potential VOUT. This example will describe the case where the voltage boosting circuit performs a voltage boosting operation with a voltage boosting rate of 3.

As shown in FIG. 6, the voltage boosting circuit includes a P-channel MOS transistor QP11 and an N-channel MOS transistor QN11 that constitute a first inverter, a P-channel MOS transistor QP12 and an N-channel MOS transistor QN12 that constitute a second inverter, and a P-channel MOS transistors QP21 to QP23 that perform the charge-pump operation.

The voltage boosting circuit also includes capacitors C1 to C3 connected to these transistors, and level shifters (L/S) 1 to 3 that respectively supply gate potentials G1 to G3 to the transistors QP21 to QP23. Note that a configuration may also be employed in which a part of the voltage boosting circuit is incorporated in the display driver IC, and the capacitors C1 to C3 are externally attached to the display driver IC. By externally attaching the capacitors C1 to C3 to the display driver IC, it is possible to secure the capacity and lower the frequency of the voltage boosting clock signal to achieve lower power consumption.

The charging and discharging of the capacitors C1 and C2 are repeated by inverting operations of the first and second inverters and switching operations of the transistors QP21 to QP23, the charge accordingly moves, and thus the charge-pump operation is performed. As a result, the output power supply potential VOUT gradually rises, and reaches about three times (3×V volt) the input power supply potential VIN (V volt) in a stationary state.

Figure 7:
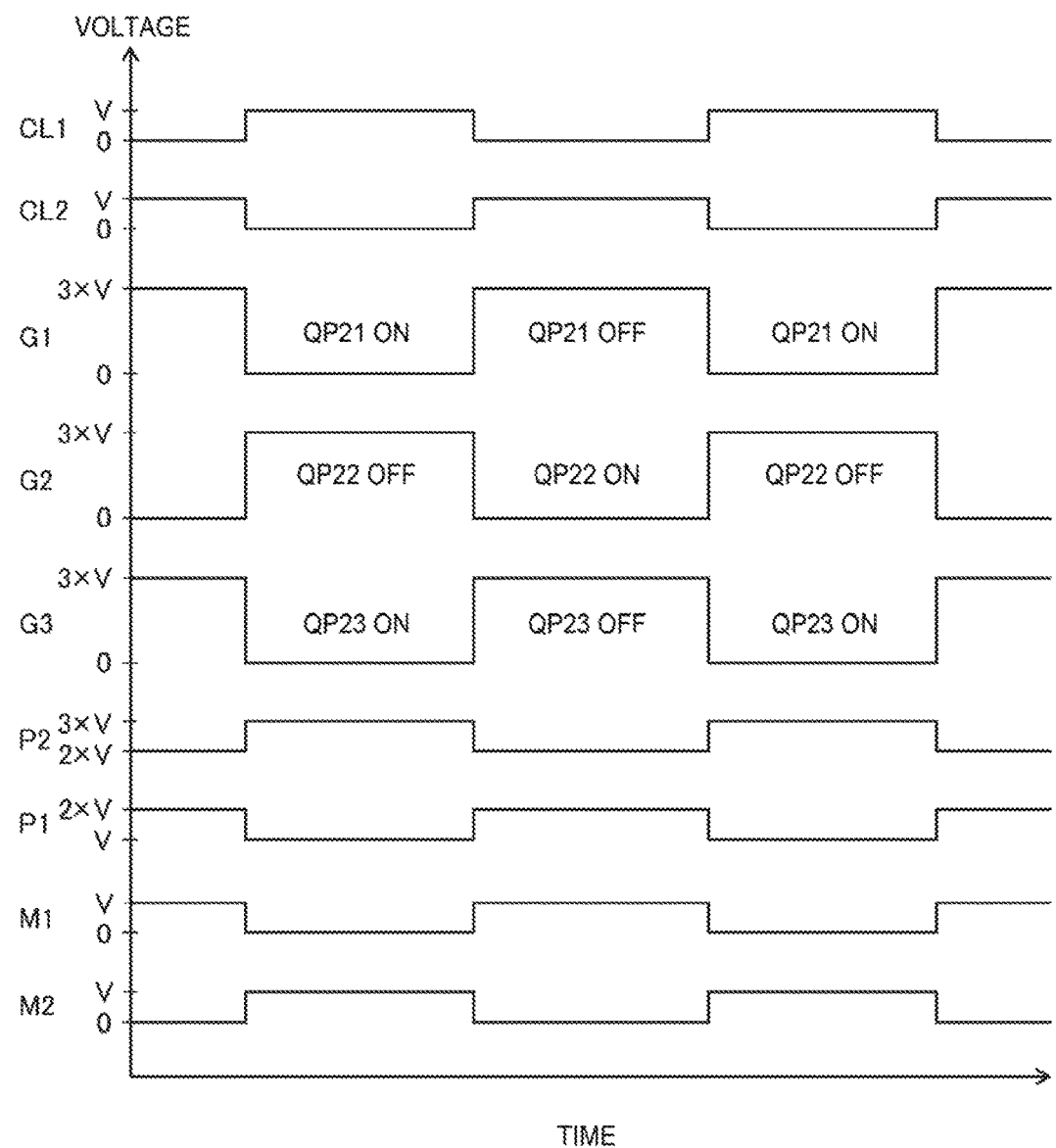
FIG. 7 is a waveform diagram showing voltage waveforms in respective parts of a voltage boosting circuit shown in FIG. 6.

FIG. 7 is a waveform diagram showing voltage waveforms of respective parts of the voltage boosting circuit shown in FIG. 6. FIG. 7 shows voltage waveforms after reaching the stationary state. The voltage boosting clock signals CL1 and CL2 are signals of mutually opposite phases, and transition between 0 volt and V volt. By shifting the high level of the boosting clock signals CL1 and CL2 using the level shifters 1 to 3, the gate potentials G1 to G3 that shift between 0 volt and 3×V volt are obtained.

These gate potentials G1 to G3 are applied respectively to gates of the transistors QP21 to QP23, and the transistors QP21 to QP23 perform the switching operations. Thereby, potentials P1 and M1 at respective ends of the capacitor C1 and potentials P2 and M2 at respective ends of the capacitor C2 change as shown in FIG. 7. As a result, the output power supply potential VOUT reaches 3×V volt and is held at the capacitor C3. In the following description, a capacitor that holds the power supply potential at a final stage of the power supply circuit will also be called a bypass capacitor.

Here, the higher the frequency of the voltage boosting clock signals CL1 and CL2 supplied to the voltage boosting circuit is, the charge is more immediately supplied from the input power supply potential VIN even if a load current increases, and therefore, a decrease of the output power supply potential VOUT can be suppressed. Accordingly, the higher the frequency of the voltage boosting clock signals CL1 and CL2 is, the higher the current supply capability of the power supply circuit is. Meanwhile, the power consumption of the voltage boosting circuit is roughly proportional to the frequency of the voltage boosting clock signals CL1 and CL2. Accordingly, the lower the frequency of the voltage boosting clock signals CL1 and CL2 is, the power consumption in the power supply circuit can be further reduced.

The power supply control unit 226 shown in FIG. 4 may generate the voltage boosting clock signals based on a clock signal supplied from the timing control unit 223. The power supply control unit 226 may change the current supply capability of the power supply circuit 24 by changing the frequency of the voltage boosting clock signals supplied to the primary voltage boosting circuit 242 or the secondary voltage boosting circuit 244 shown in FIG. 5, or controlling whether to supply the voltage boosting clock signals to the primary voltage boosting circuit 242 or the secondary voltage boosting circuit 244.

For example, the power supply control unit 226 sets the frequency of the voltage boosting clock signals to a first frequency f1 in a standard power mode, and sets the frequency of the voltage boosting clock signals to a second frequency f2, which is lower than the first frequency f1, in a low power consumption mode. Note that a configuration may be employed in which the voltage boosting clock signals continue to be supplied to the primary voltage boosting circuit 242, and only the supply of the voltage boosting clock signals to the secondary voltage boosting circuit 244, whose boosting factor is larger than that of the primary voltage boosting circuit 242, is stopped.

Also, the power supply control unit 226 may change the current supply capability of the power supply circuit 24 by changing the amount of a constant current that flows through a differential amplification stage of the first regulator 241 or the second regulator 243 shown in FIG. 5, or by generating a control signal for operating or stopping the constant current. For example, the power supply control unit 226 sets the amount of the constant current at the differential amplification stage to a first value A1 in the standard power mode, and sets the amount of the constant current at the differential amplification stage to a second value A2, which is smaller than the first value A1, in the low power consumption mode.

When changing the driving voltage applied to the electro-optical panel 10 (FIG. 1), the driving voltage generation unit 23 needs the power in order to drive capacitance components between the top plane electrode and the segment electrodes. In addition, since resistance components exist between the top plane electrode and the segment electrodes, a leakage current flows and power is consumed also in a time period in which a DC voltage is applied to the electro-optical panel 10.

The power supply control information storage unit 225 shown in FIG. 4 stores, in various forms, power supply control information regarding a timing of switching the current supply capability of the power supply circuit 24. The power supply control unit 226 controls the current supply capability of the power supply circuit 24 in accordance with the power supply control information stored in the power supply control information storage unit 225.

Basically, the power supply control unit 226 sets the current supply capability of the power supply circuit 24 to a first level synchronously with a timing of start of a phase, in accordance with the driving timing of the electro-optical panel 10 controlled by the timing control unit 223. The timing of setting the current supply capability of the power supply circuit 24 to the first level may be identical to the timing of start of a phase, or may be earlier or later than the timing of start of a phase by a predetermined time period, or may be determined in accordance with various conditions, as will be described later.

Also, the power supply control unit 226 sets the current supply capability of the power supply circuit 24 to a second level, which is lower than the first level, after at least a predetermined time period has elapsed since the current supply capability of the power supply circuit 24 was set to the first level. Here, the predetermined time period refers to a one-frame period, for example. The timing of setting the current supply capability of the power supply circuit 24 to the second level may be determined in accordance with various conditions, as will be described later.

Thereby, when changing the driving voltage applied to any of the electrodes in the electro-optical panel 10, the current supply capability of the power supply circuit 24 is increased to the first level, and thereafter the current supply capability of the power supply circuit 24 is decreased to the second level. It is therefore possible to reduce the power consumption at the time of driving the electro-optical panel 10 while suppressing degradation in optical properties of the electro-optical panel 10.

For example, the power supply control unit 226 may set the current supply capability of the power supply circuit 24 to the first level by operating the power supply circuit 24 in the standard power mode, and set the current supply capability of the power supply circuit 24 to the second level by operating the power supply circuit 24 in the low power consumption mode or stopping operations of the power supply circuit 24. In this case, the power consumption can be significantly reduced in a time period in which the driving voltage applied to the plurality of electrodes in the electro-optical panel 10 is not changed.

Alternatively, the power supply control unit 226 may set the current supply capability of the power supply circuit 24 to the first level by operating the power supply circuit 24 in the standard power mode, and set the current supply capability of the power supply circuit 24 to the second level by alternately operating the power supply circuit 24 in the standard power mode and the low power consumption mode, or intermittently operating the power supply circuit 24. In this case, a decrease of the power supply voltage can be recovered even if a leakage current flows through the plurality of electrodes in the electro-optical panel 10 in a time period in which the current supply capability of the power supply circuit 24 is maintained at the second level.

First Example of Power Supply Control

The power supply control unit 226 shown in FIG. 4 can change the current supply capability of the power supply circuit 24 by controlling the power supply circuit 24 using several methods and at several timings. In a first example of power supply control, the power supply control unit 226 changes the current supply capability of the power supply circuit 24 by controlling whether to supply the voltage boosting clock signals to the power supply circuit 24.

FIGS. 8A to 8C, 9A to 9C, and 10A to 10C are diagrams showing exemplary settings of the driving waveforms according to the first embodiment of the invention. For example, the host CPU 40 shown in FIG. 1 sets the timing information in the display controller 22 in accordance with the temperature measured by the temperature sensor 27. Meanwhile, the host CPU 40 can set fixed waveform information in the display controller 22 regardless of the temperature. The following description will describe the case where two types of phase length are used in order to set the driving waveforms.

The timing information shown in FIGS. 8A to 8C is used when the temperature T is 20° C., and may be applied to a temperature range (ordinary temperature) of 10° C.<T≤30° C., for example. FIG. 8A shows the timing information stored in the timing information storage unit 221 in the display controller 22 shown in FIG. 4, and phase time corresponding thereto.

Here, "phase time" corresponds to driving voltage application time that is determined by a product of the frame time and the phase length. The timing information storage unit 221 stores "40", which means 40 milliseconds, as the frame time information. The timing information storage unit 221 also stores phase length information, which indicates the length of a phase in which a constant driving voltage is applied to the electro-optical panel, in association with the index number.

As shown in FIG. 8A, the phase length "1" is set in association with the index number "0", and accordingly, if the index number "0" is designated in the waveform information, the phase length is "1" and the phase time is 40 milliseconds. Also, the phase length "4" is set in association with the index number "1", and accordingly, if the index number "1" is designated in the waveform information, the phase length is "4" and the phase time is 160 milliseconds.

It is also assumed that the power supply control information "1" is stored in the power supply control information storage unit 225. Here, the power supply control information "1" indicates, as the number of frames, the time period in which the current supply capability of the power supply circuit 24 is maintained at the first level. Note that, in the case of setting, for each phase, the time period in which the current supply capability of the power supply circuit 24 is maintained at the first level, the power supply control information may be stored in the waveform information storage unit 222.

FIG. 8B shows the waveform information stored in the waveform information storage unit 222 in the display controller 22 shown in FIG. 4, the phase length and the phase time corresponding thereto, and the like in the driving mode 1 (high-speed mode). FIG. 8C shows the waveform information stored in the waveform information storage unit 222 shown in FIG. 4, the phase length and the phase time corresponding thereto, and the like in the driving mode 2 (low-afterimage mode). Although the frame numbers and the phase numbers are indicated in FIGS. 8B and 8C in order to clearly show the relationship between the frames and phases, they do not constitute the waveform information and are not stored in the waveform information storage unit 222.

Here, "TP" indicates the waveform value of the top plane signal. "BB", "BW", "WB", and "WW" indicate the waveform values of the segment signals and correspond respectively to the segment signals SWV (1, 1), SWV (1, 2), SWV (2, 1), and SWV (2, 2). For example, the waveform value "0" indicates a driving voltage of 0 V, and the waveform value "1" indicates a driving voltage of 15 V.

The waveform information storage unit 222 stores the waveform values TP, BB, BW, WB, and WW, and the index number for each phase. The counter setting unit 303 in the timing control unit 223 can read out the phase length by referencing the timing information storage unit 221 based on the index number designated in the waveform information stored in the waveform information storage unit 222. Furthermore, the phase time is determined by a product of the frame time and the phase length. Accordingly, the waveforms can be flexibly generated by combinations of the frame time and the phase length.

A change of the display state in the driving mode 1 will now be described with reference to FIG. 8B. In a 1st phase (phase number 0), 15 V is applied to the top plane electrode. 0 V is applied to the segment electrode of a segment whose first display state is black and the second display state is white, and the display state thereof transitions to white. In the other segments, 15 V, which is the same as the voltage applied to the top plane electrode, is applied to the segment electrodes, and the display state thereof does not change.

Next, in a 2nd phase (phase number 1), 0 V is applied to the top plane electrode. 15 V is applied to the segment electrode of a segment whose first display state is white and the second display state is black, and the display state thereof transitions to black. In other segments, 0 V, which is the same as the voltage applied to the top plane electrode, is applied to the segment electrodes, and the display state thereof does not change.

Lastly, in a 3rd phase (phase number 2), 0 V is applied to the top plane electrode and all segment electrodes. Thereby, the charge at the electrodes is discharged. Thus, in the driving mode 1, the display state is changed by applying an electric field only to a segment whose first display state and the second display state are different.

Also, since the power supply control information is "1", the power supply control unit 226 shown in FIG. 4 sets the current supply capability of the power supply circuit 24 to the first level by supplying the voltage boosting clock signals to the power supply circuit 24 while the driving voltage for a frame at the top of each phase is output. That is to say, the power supply control unit 226 supplies the voltage boosting clock signals to the power supply circuit 24 (power supply circuit "ON" in the drawing) in the 1st, 5th, and 9th frames in which a large current flows through the driving voltage generation unit 23. The power supply circuit 24 generates the power supply voltage (VPP-VSS) by performing the voltage boosting operation in accordance with the voltage boosting clock signals, and stores charge in the bypass capacitor.

In the other frame periods, the power supply control unit 226 sets the current supply capability of the power supply circuit 24 to the second level (power supply circuit "OFF" in the drawing) by stopping the voltage boosting clock signal to fix the driving voltages at a low level or a high level. In this time period, charge flows out from the bypass capacitor toward the segment electrodes in the electro-optical panel via the driving voltage generation unit 23. The power supply voltage (VPP-VSS) is only held by the bypass capacitor, and gradually decreases.

With the above operations, the driving voltages output to the segment electrodes are switched. The power supply circuit 24 operates only in the 1st, 5th, and 9th frames in which a large amount of charge needs to be supplied, and the power supply circuit 24 stops to operate in the other frames, namely the 2nd to 4th and 6th to 8th frames in which the charge is not significantly consumed. Therefore, the power consumption can be reduced in the 2nd to 4th and 6th to 8th frames.

Next, a change of the display state in the driving mode 2 will be described with reference to FIG. 8C. In the 1st phase, 0 V is applied to the top plane electrode. 0 V is applied to the segment electrode of a segment whose first display state is black, and the display state thereof does not change. 15 V is applied to the segment electrode of a segment whose first display state is white, and the display state thereof changes to black. That is to say, all segments display black here.

In the 2nd phase, 15 V is applied to the top plane electrode. 0 V is applied to the segment electrodes of all segments, and the display state thereof changes to white. That is to say, all segments display white here. In the 3rd phase, 0 V is applied to the top plane electrode. 15 V is applied to the segment electrode of a segment whose second display state is black, and the display state thereof changes to black. Since 0 V is applied to the segment electrode of a segment whose second display state is white, the display state thereof does not change.

In the driving mode 2 as well, the power supply circuit 24 operates only in the 1st, 5th, 9th, and 13th frames in which a large amount of charge needs to be supplied, and the power supply circuit 24 stops to operate in the other frames, namely the 2nd to 4th, 6th to 8th, and 10th to 12th frames in which the charge is not significantly consumed. Accordingly, the power consumption can be reduced.

The last phases in FIGS. 8B and 8C are end phases for causing the top plane electrode and the segment electrodes to be in a non-biased state to discharge the charge. For example, if the time period of the end phase is set shorter than a one-frame period of a phase in which a bias voltage is applied between the top plane electrode and the segment electrodes, the voltage boosting operation in the power supply circuit 24 can be stopped early to reduce the power consumption.

The waveform information storage unit 222 may store, as the waveform information for the driving mode 1, the end phase position information indicating the phase number "2" of the end phase in addition to the waveform information shown in FIG. 8B, and store, as the waveform information for the driving mode 2, the end phase position information indicating the phase number "3" of the end phase in addition to the waveform information shown in FIG. 8C.

As shown in FIGS. 8A to 8C, in the case where the index number is expressed by 3 bits and the phase length is expressed by 8 bits, the phase length of up to 255 can be set based on the 3-bit index number. However, in the exemplary settings shown in FIGS. 8B and 8C, only "0" and "1" are used as the index number, and accordingly the index number may be indicated in units of 1 bit. Thus, the data area necessary in the display controller 22 can be reduced by using the index number in place of the phase length information in the waveform information.

Here, since the phase length that is set in the timing information is applied in common to the plurality of driving modes, it is possible to reduce the traffic between the host CPU 40 and the display controller 22 shown in FIG. 1, as well as the load on the host CPU 40. In addition, since a storage area for the phase length information does not need to be provided for each driving mode, the data area necessary in the display controller 22 can be reduced.

The timing information shown in FIGS. 9A to 9C are used when the temperature T is 0° C., and may be applied to a temperature range of T≤10° C. (which is lower than the temperature range in FIG. 8), for example. FIG. 9A shows the timing information stored in the timing information storage unit 221 in the display controller 22 shown in FIG. 4, and phase time corresponding thereto.

As shown in FIG. 9A, "80", which means 80 milliseconds, is set as the frame time information. For example, the phase length "1" is set in association with the index number "0", and accordingly, if the index number "0" is designated in the waveform information, the phase length is "1" and the phase time is 80 milliseconds. Also, the phase length "25" is set in association with the index number "1", and accordingly, if the index number "1" is designated in the waveform information, the phase length is "25" and the phase time is 2000 milliseconds.

Thus, the phase time can be prolonged by setting the frame time and the phase length in the timing information longer than those in FIG. 8A to 8C. Alternatively, the phase time may be prolonged by setting either the frame time or the phase length in the timing information longer than in FIGS. 8A to 8C, and setting the product of the frame time and the phase length larger than in FIGS. 8A to 8C.

FIG. 9B shows the waveform information stored in the waveform information storage unit 222 in the display controller 22 shown in FIG. 4, the phase length and the phase time corresponding thereto, and the like in the driving mode 1 (high-speed mode). FIG. 9C shows the waveform information stored in the waveform information storage unit 222 shown in FIG. 4, the phase length and the phase time corresponding thereto, and the like in the driving mode 2 (low-afterimage mode).

In FIGS. 9A to 9C as well, the power supply circuit 24 operates only in frame periods in which a large amount of charge needs to be supplied, and the power supply circuit 24 stops to operate in the other frame periods in which charge is not significantly consumed. Accordingly, the power consumption can be reduced. Specifically, the power supply control unit 226 supplies the voltage boosting clock signals to the power supply circuit 24 (power supply circuit "ON" in the diagram) in the 1st, 26th, 51st, and 76th frames, which are the top of respective phases, and does not supply the voltage boosting clock signals to the power supply circuit 24 (power supply circuit "OFF" in the diagram) in the 2nd to 25th, 27th to 50th, and 52nd to 75th frames. In addition, since the same waveform information as that shown in FIGS. 8A to 8C can be used, the waveform information does not need to be changed by the host CPU 40 (FIG. 1). The phase length and the phase time can be changed by changing the timing information.

The timing information shown in FIGS. 10A to 10C are used when the temperature T is 50° C., and may be applied to a temperature range of T>30° C. (which is higher than the temperature range in FIGS. 8A to 8C), for example. FIG. 10A shows the timing information stored in the timing information storage unit 221 in the display controller 22 shown in FIG. 4, and phase time corresponding thereto.

As shown in FIG. 10A, "20", which means 20 milliseconds, is set as the frame time information. For example, the phase length "1" is set in association with the index number "0", and accordingly, if the index number "0" is designated in the waveform information, the phase length is "1" and the phase time is 20 milliseconds. Also, the phase length "5" is set in association with the index number "1", and accordingly, if the index number "1" is designated in the waveform information, the phase length is "5", and the phase time is 100 milliseconds.

Thus, the phase time can be shortened by setting the frame time in the timing information shorter than in FIGS. 8A to 8C. Alternatively, the phase time may be shortened by setting either the frame time or the phase length in the timing information shorter than in FIGS. 8A to 8C, and setting the product of the frame time and the phase length smaller than in FIGS. 8A to 8C.

FIG. 10B shows the waveform information stored in the waveform information storage unit 222 in the display controller 22 shown in FIG. 4, the phase length and the phase time correspond thereto, and the like in the driving mode 1 (high-speed mode). FIG. 10C shows the waveform information stored in the waveform information storage unit 222 shown in FIG. 4, the phase length and the phase time corresponding thereto, and the like in the driving mode 2 (low-afterimage mode).

In FIGS. 10A to 10C as well, the power supply circuit 24 operates only in frame periods in which a large amount of charge needs to be supplied, and the power supply circuit 24 stops to operate in the other frame periods in which charge is not significantly consumed. Accordingly, the power consumption can be reduced. Specifically, the power supply control unit 226 supplies the voltage boosting clock signals to the power supply circuit 24 (power supply circuit "ON" in the diagram) in the 1st, 6th, 11th, and 16th frames, which are the top of respective phases, and does not supply the voltage boosting clock signals to the power supply circuit 24 (power supply circuit "OFF" in the diagram) in the 2nd to 5th, 7th to 10th, and 12th to 15th frames. In addition, since the same waveform information as that shown in FIGS. 8A to 8C can be used, the waveform information does not need to be changed by the host CPU 40 (FIG. 1). The phase length and the phase time can be changed by changing the timing information.

Thus, by storing the phase length information in the timing information storage unit 221 in association with the index number, the index number whose number of bits is small need only be stored for each phase in the waveform information storage unit 222 in place of the phase length information in order to set the driving voltage application period. Accordingly, the data area in the integrated circuit device can be reduced.

Furthermore, in the case of compensating the driving waveforms in accordance with a temperature change as well, the phase length information stored in the timing information storage unit 221 need only be changed or selected, and the waveform information storage unit 222 can use identical index number in common for various environmental conditions. Accordingly, it is possible to reduce the traffic and the load on the host CPU or the like, and reduce the data area in the integrated circuit device.

Next, a description will be given of a specific example of the driving waveforms generated by the display driver shown in FIG. 4. In the electro-optical panel, black display or white display is performed, depending on the polarity of the driving bias applied between the segment electrodes and the top plane electrode. Note that it is possible to add a specific color to white display by inserting a color filter. In this case, the white color in white display can be replaced with the color of the color filter. In addition to black display and white display, red display or blue display may be employed by replacing one of black electrophoretic particles and white electrophoretic particles with red particles and replacing the other with blue particles.

Figure 11:
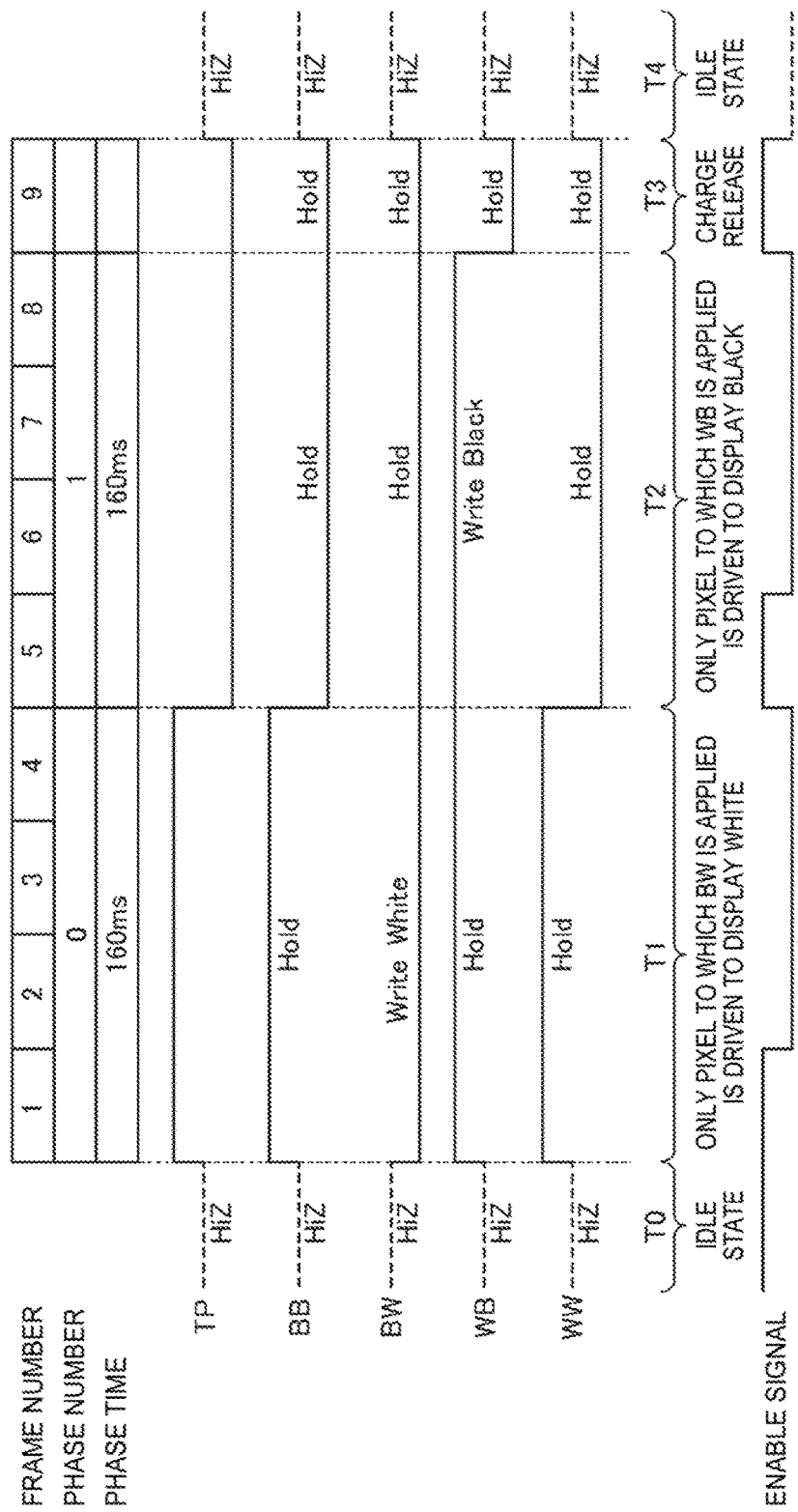
FIG. 11 is a waveform diagram showing exemplary driving waveforms generated by a display driver shown in FIG. 4.

FIG. 11 is a waveform diagram showing exemplary driving waveforms generated by the display driver shown in FIG. 4. FIG. 11 shows, as an example, the driving waveforms in the driving mode 1 (high-speed mode) in the case where the temperature is 20° C. In FIG. 11, "TP" indicates the waveform value of the top plane signal. "BB", "BW", "WB", and "WW" indicate the waveform values of the segment signals, and correspond respectively to the segment signals SWV (1, 1), SWV (1, 2), SWV (2, 1), and SWV (2, 2).

After the first display corresponding to the first display data DL is performed, in a time period T0 in which the first display state is maintained, the top plane electrode and all segment electrodes are set to an idle state (high-impedance state: HiZ).

Next, in a time period T1, a high-level driving voltage is supplied to the top plane electrode. Also, a high-level driving voltage is supplied to the segment electrodes of pixels to which the driving waveforms of BB, WB, and WW are applied, and the top plane electrode and these segment electrodes are set to a non-biased state (Hold). Meanwhile, a low-level driving voltage is supplied to the segment electrode of a pixel to which the driving waveform of BW is applied, the top plane electrode enters a positively biased state with respect to the segment electrode, and the display state changes from black display to white display (Write White).

Next, in a time period T2, a low-level driving voltage is supplied to the top plane electrode. Also, a low-level driving voltage is supplied to the segment electrodes of pixels to which the driving waveforms of BB, BW, and WW are applied, and the top plane electrode and the segment electrodes are set to a non-biased state (Hold). Meanwhile, a high-level driving voltage is supplied to the segment electrode of a pixel to which the driving waveform of WB is applied, the top plane electrode enters a negatively biased state with respect to the segment electrode, and the display state changes from white display to black display (Write Black). Thereby, the second display corresponding to the second display data DP is performed.

Next, in a time period T3, a low-level driving voltage is supplied to the top plane electrode and all segment electrodes, and the top plane electrode and the segment electrodes are set to a non-biased state (Hold). Thereby, the charge is discharged. Thereafter, in a time period T4, the top plane electrode and the segment electrodes are set to an idle state, and the second display state is maintained.

Here, the timing control unit 223 shown in FIG. 4 sets the length (phase time) of each time period (timing setting) based on the index number that is read out from the storage areas RT1 to RTM in the waveform information storage unit 222. Thereby, the lengths of the time periods T1 to T3 are set based on the index number. The power supply control unit 226 sets the current supply capability of the power supply circuit 24 to the first level by setting the enable signal to a high level to activate the enable signal, and sets the current supply capability of the power supply circuit 24 to the second level by setting the enable signal to a low level to deactivate the enable signal.

Second Example of Power Supply Control

In a second example of power supply control, the power supply control unit 226 shown in FIG. 4 changes the current supply capability of the power supply circuit 24 by changing the frequency of the voltage boosting clock signals supplied to the power supply circuit 24. Other points in the second example are similar to the first example.

FIG. 12 is a diagram showing the second example of power supply control according to the first embodiment of the invention. FIG. 12 shows, as an example, the power supply control in the driving mode 1 (high-speed mode) in the case where the temperature is 20° C. In the driving period in which the driving voltage is generated in a plurality of phases, the power supply control unit 226 does not stop the supply of the voltage boosting clock signals to the power supply circuit 24 but changes the frequency of the voltage boosting clock signals.

For example, the power supply control unit 226 sets the current supply capability of the power supply circuit 24 to the first level by setting the frequency of the voltage boosting clock signals to 8 kHz in the 1st, 5th, and 9th frames, each of which is a single frame at the top of the corresponding phase shown in FIG. 12. The power supply control unit 226 also sets the current supply capability of the power supply circuit 24 to the second level by setting, in the other frames, the frequency of the voltage boosting clock signals to 4 kHz, which is lower than the frequency of the voltage boosting clock signals for the single frame at the top of each phase.

In the second example of power supply control, a state in which the voltage boosting clock signals of 8 kHz are supplied to the power supply circuit 24 corresponds to the standard power mode, and a state where the voltage boosting clock signals of 4 kHz are supplied to the power supply circuit 24 corresponds to the low power consumption mode. In the low power consumption mode, compared with the standard power mode, the driving capability of the power supply circuit 24 is low, whereas the power consumption is also low. Even if the frequency of the voltage boosting clock signals is low, a decrease of the driving voltages in the 2nd to 4th and 6th to 8th frames can be suppressed by continuing to supply the voltage boosting clock signals to the power supply circuit 24.

Third Example of Power Supply Control

In the third example of power supply control, the power supply control unit 226 shown in FIG. 4 sets the current supply capability of the power supply circuit 24 to the second level by intermittently operating the power supply circuit 24 or cyclically setting the low power consumption mode. Other points in the third example are similar to the first and second examples.

FIG. 13 is a diagram showing the third example of power supply control according to the first embodiment of the invention. FIG. 13 shows, as an example, the power supply control in the driving mode 2 (low-afterimage mode) in the case where the temperature is 20° C. The power supply control information storage unit 225 or the waveform information storage unit 222 shown in FIG. 4 stores first power supply control information (e.g., "1") indicating, as the number of frames, a time period in which the current supply capability of the power supply circuit 24 is maintained at the first level, as well as second power supply control information (e.g., "1") indicating, as the number of frames, a time period in which the current supply capability of the power supply circuit 24 is maintained at the second level.

In this case, upon a phase starting, the power supply control unit 226 sets the current supply capability of the power supply circuit 24 to the first level by supplying the voltage boosting clock signals to the power supply circuit 24 in a first one frame in accordance with the first power supply control information. In the next one frame, the power supply control unit 226 sets the current supply capability of the power supply circuit 24 to the second level by stopping the supply of the voltage boosting clock signals or lowering the frequency of the voltage boosting clock signals. The power supply control unit 226 repeats this until the phase changes.

As a result, in the 1st, 3rd, 5th, 7th, 9th, 11th, and 13th frames shown in FIG. 13, the voltage boosting clock signals are supplied to the power supply circuit 24, and the power supply circuit 24 operates in the standard power mode. In the remaining frames, namely the 2nd, 4th, 6th, 8th, 10th, and 12th frames, the voltage boosting clock signals are stopped, or the frequency of the voltage boosting clock signals is lowered, and the power supply circuit 24 stops or operates in the low power consumption mode.

According to the third example of power supply control, compared with the first example, the power consumption increases because the time period in which the power supply circuit 24 is in an operating state is prolonged. However, charge is cyclically supplied to the bypass capacitor of the power supply circuit 24, and therefore, the voltage boosting power supply potential VPP can be held at a higher potential (near 15 V). The third example is particularly effective in maintaining the voltage boosting power supply potential VPP when the phase time is long.

Fourth Example of Power Supply Control

In a fourth example of power supply control, the power supply control unit 226 shown in FIG. 4 sets the current supply capability of the power supply circuit 24 to the first level prior to a timing of start of a phase. Other points in the fourth example are similar to the first to third examples.

For example, as shown in FIG. 11, the power supply control unit 226 sets the enable signal to be supplied to the power supply circuit 24 to a high level to activate the enable signal prior to the timing of start of the 1st phase (phase number 0). Thereby, the current supply capability of the power supply circuit 24 is set to the first level. The power supply control unit 226 sets the enable signal to a low level to deactivate the enable signal after at least a predetermined time period has elapsed since the current supply capability of the power supply circuit 24 was set to the first level. Thereby, the current supply capability of the power supply circuit 24 is set to the second level that is lower than the first level.

Alternatively, the power supply control unit 226 may start or stop the supply of the clock signal to the power supply circuit 24 or change the frequency of the clock signals between the first frequency and the second frequency, instead of activating or deactivating the enable signal. According to the fourth example of power supply control, the current supply capability of the power supply circuit 24 can be sufficiently increased before the driving voltage generation unit 23 generates the driving voltages.

Fifth Example of Power Supply Control

In a fifth example of power supply control, the length of a time period is not fixed in which the current supply capability of the power supply circuit 24 is maintained at the first level or the second level, and the power supply control unit 226 shown in FIG. 4 determines the length of the time period in which the current supply capability of the power supply circuit 24 is maintained at the first level or the second level, in accordance with the temperature measured by the temperature sensor 27 (FIG. 1). Other points in the fifth example are similar to the first to fourth examples.

For example, it is assumed that the power supply control information storage unit 225 shown in FIG. 4 stores in advance "1" in association with the case where the temperature is lower than 40° C., and stores in advance "2" in association with the case where the temperature is 40° C. or higher, as the power supply control information indicating, as the number of frames, the time period in which the current supply capability of the power supply circuit 24 is maintained at the first level. The following description will describe the case where the driving mode 1 (high-speed mode) is applied.

The control unit 26 shown in FIG. 1, upon receiving a display start command from the host CPU 40, controls the temperature sensor 27 so as to measure the temperature. In the case where the temperature measured by the temperature sensor 27 is 20° C., the driving waveforms are as shown in FIG. 8B. Accordingly, the timing control unit 223 shown in FIG. 4 sets the frame time to 40 milliseconds. The power supply control unit 226 sets the current supply capability of the power supply circuit 24 to the first level in the 1st, 5th, and 9th frames, and sets the current supply capability of the power supply circuit 24 to the second level in the remaining frames, namely the 2nd to 4th and 6th to 8th frames.

On the other hand, in the case where the temperature measured by the temperature sensor 27 is 50° C., the driving waveforms are as shown in FIG. 10B. Accordingly, the timing control unit 223 sets the frame time to 20 milliseconds. The power supply control unit 226 sets the current supply capability of the power supply circuit 24 to the first level in the 1st, 2nd, 6th, 7th, and 11th frames, and sets the current supply capability of the power supply circuit 24 to the second level in the remaining frames, namely the 3rd to 5th and 8th to 10th frames.

Here, the length of the time period in which the current supply capability of the power supply circuit 24 is set at the second level is 40 milliseconds×3=120 milliseconds in the case of 20° C., and is 20 milliseconds×3=60 milliseconds in the case of 50° C. Accordingly, compared with the case of not changing the number of frames of the first level period based on the temperature, the ratio of the second level period in the case of high temperature can be set smaller. That is to say, when the first level period is expressed as T1 and the second level period is expressed as T2, T2/(T1+T2) can be set smaller.

In the fifth example of power supply control, a change of the driving voltage in the second level period can be suppressed even in the case where the electro-optical panel to be driven has temperature characteristics, and a resistance value between the top plane electrode and the segment electrodes lowers (i.e., the leakage current increases) as the temperature rises.

Sixth Example of Power Supply Control

In a sixth example of power supply control, the power supply control unit 226 shown in FIG. 4 determines the length of the time period in which the current supply capability of the power supply circuit 24 is maintained at the first level or the second level, in accordance with the number of output terminals to which the driving voltages are applied that change at a timing of start of a phase, or the total area of pixel electrodes connected to these output terminals in the electro-optical panel. Other points in the sixth example are similar to the first to fourth examples. The following description will describe the case where the temperature is 20° C. and the driving mode 1 (high-speed mode) is applied.

As shown in FIG. 4, the power supply control unit 226 includes a driven pixel electrode counting unit 226a. The driven pixel electrode counting unit 226a, upon receiving a display start command from the host CPU 40 (FIG. 1), compares present display data with next display data that correspond to a plurality of pixel electrodes, and thereby counts the number of pixel electrodes with different display data (which are pixel electrodes to which the driving waveform of BW is applied and pixel electrodes to which the driving waveform of WB is applied, and will also be referred to as "driven pixel electrodes" below) to obtain a count value. Here, the number of driven pixel electrodes is equal to the number of output terminals to which the driving voltages are applied that change at a timing of start of a phase.

For example, the power supply control unit 226 sets the power supply control information, which indicates, as the number of frames, a time period in which the current supply capability of the power supply circuit 24 is maintained at the first level to "1" if the count value is 3 or less, and sets the power supply control information to "2" if the count value is 4 or more. Upon the driving of the electro-optical panel being started in this state, in the case where the number of driven pixel electrodes is 3 or less, the time period in which the current supply capability of the power supply circuit 24 is maintained at the second level is 40 milliseconds×3=120 milliseconds, and in the case where the number of driven pixel electrodes is 4 or more, the time period in which the current supply capability of the power supply circuit 24 is maintained at the second level is 40 milliseconds×2=80 milliseconds.

In the high-speed mode, the pixel electrodes to which the driving waveforms of BB or WW are applied are driven with completely the same potential as that of the top plane electrode, and therefore, almost no current flows through the electrophoretic layer 13 (FIG. 3) between the pixel electrodes and the top plane electrode. That is to say, these pixel electrodes do not put a load on the power supply circuit 24. On the contrary, a current flows through the electrophoretic layer 13 (FIG. 3) between the top plane electrode and the pixel electrodes to which the driving waveform of BW or WB is applied, and accordingly, the load on the power supply circuit 24 is heavier as the number of these pixel electrodes is larger. Accordingly, the magnitude of the load can be estimated using the count value of the number of driven pixel electrodes, and therefore, it is possible to prolong the first level period to maintain the current supply capability of the power supply circuit 24 at a high level if the load is large, and to prolong the second level period to reduce the current consumption if the load is small.

Alternatively, a configuration may be employed in which information (first electrode information) regarding the area of each pixel electrode is stored in advance in the power supply control information storage unit 225, and the driven pixel electrode counting unit 226a calculates the total area of the driven pixel electrodes based on the first electrode information. The capacitance between a pixel electrode and the top plane electrode is determined by the area of the pixel electrode, and the larger the capacitance is, a larger current is necessary for driving this pixel electrode.

For example, the power supply control unit 226 compares the total area of the driven pixel electrodes with a threshold value, sets "1" as the power supply control information if the total area of the driven pixel electrode is less than or equal to the threshold value, and sets "2" as the power supply control information if the total area of the driven pixel electrode is more than the threshold value. In particular, since the area of the backplane electrode is large, the power supply control unit 226 may always shorten the second level period in the case where the driving waveform of BW or WB is applied to the backplane electrode.

Also, a configuration may be employed in which the display controller 22 shown in FIG. 4 has a so-called a partial driving function, and the host CPU 40 (FIG. 1) directly designates the pixel electrode to be driven to the display controller 22. For example, in the case where a first pixel electrode and a second pixel electrode are to be driven, the driving voltage may be applied only to the first and second pixel electrodes, and the same potential as that of the top plane electrode may always be applied to the other pixel electrodes. Information (second electrode information) regarding the pixel electrodes to which the driving voltages are applied is stored in the power supply control information storage unit 225.

In this case, the driven pixel electrode counting unit 226a may calculate, using the second electrode information, the number of output terminals to which the driving voltages are applied that change at a timing of start of a phase, or the total area of the pixel electrodes connected to these output terminals in the electro-optical panel. Thereby, power supply control can also be performed while effectively estimating the load on the power supply circuit 24, similarly to the above-described case, in the driving mode 2 (low-afterimage mode) in which the driving voltages are also applied to the pixels to which the driving waveform of BB or WW is applied.

Thus, according to the sixth example of power supply control, it is possible to appropriately determine the length of the time period in which the current supply capability of the power supply circuit 24 is maintained at the first level or the second level, based on the magnitude of the load on the power supply circuit 24.

Seventh Example of Power Supply Control

In a seventh example of power supply control, the power supply control unit 226 shown in FIG. 4 determines the length of the time period in which the current supply capability of the power supply circuit 24 is maintained at the first level or the second level, in accordance with the total length of the boundary line between adjoining pixel electrodes to which different driving voltages are applied in the electro-optical panel after a phase starts. In this application, the boundary line between adjoining pixel electrodes refers to a line that is equidistant from respective sides of the adjoining pixel electrodes that oppose each other. Other points in the seventh example are similar to the first to fourth examples. The following description will describe the case where the temperature is 20° C. and the driving mode 1 (high-speed mode) is applied.

As shown in FIG. 8B, in the 1st to 4th frames in the 1st phase (phase number 0), a potential difference occurs between the pixel electrodes to which the driving waveform of BW is applied and the other pixel electrodes. Also, in the 5th to 8th frames in the 2nd phase (phase number 1), a potential difference occurs between the pixel electrodes to which the driving waveform of WB is applied and the other pixel electrodes. In the case where different driving voltages are applied to adjoining pixel electrodes, a leakage current flows between these pixel electrodes and the power is consumed. At this time, the amount of the leakage current can be approximated as being roughly proportional to the total length of the boundary line of these pixel electrodes.

As shown in FIG. 4, the power supply control unit 226 includes a driven pixel electrode line length calculation unit 226b. The driven pixel electrode line length calculation unit 226b calculates the total length of the boundary line (hereinafter also referred to as "boundary line length") between adjoining pixel electrodes to which different driving voltages are applied in the electro-optical panel after a phase starts.

For example, consider the case of changing display content from a number "3" to "1" of black display in the pixel electrode structure of the electro-optical panel shown in FIG. 2. At this time, the driving waveform of BW is applied to the segment electrodes SEG0, SEG6, and SEG3 since the display state changes from black to white. The display state of the other segment electrodes remain black, and accordingly the driving waveform of BB is applied thereto. The display state of the backplane electrode BG remains white, and accordingly the driving waveform of WW is applied thereto.

In the 1st phase (phase number 0) shown in FIG. 8B, the total lengths of the boundary lines between the segment electrodes SEG0, SEG6, and SEG3 to which the driving waveform of BW is applied and the respective adjoining pixel electrodes are required, and these total lengths substantially coincide with a value obtained by multiplying the length L0 of the outer circumferential line in the principal surface of the segment electrode SEG0 by three (3×L0).

In the 2nd phase (phase number 1), the total length of the boundary lines between a pixel electrode to which the driving waveform of WB is applied and other adjoining pixel electrodes is required, but the pixel electrode to which the driving waveform of WB is applied does not exist, and therefore the boundary line length is zero. In the 3rd phase (phase number 2), 0 V is applied to all pixel electrodes, and therefore the boundary line length is zero.

The case where the threshold value to be compared with the boundary line length is 2×L0 will be described as an example. As the power supply control information that indicates, as the number of frames, the time period in which the current supply capability of the power supply circuit 24 is maintained at the first level, the power supply control unit 226 sets "2" if the boundary line length exceeds the threshold value, and sets "1" if the boundary line length does not exceed the threshold value.

In the 1st phase, "2" is set as the power supply control information since the boundary line length exceeds the threshold value, and in the 2nd and 3rd phases, "1" is set as the power supply control information since the boundary line length does not exceed the threshold value. As a result, the current supply capability of the power supply circuit 24 is set to the first level in the 1st, 2nd, 5th, and 9th frames, and the current supply capability of the power supply circuit 24 is set to the second level in the 3rd, 4th, 6th, 7th, and 8th frames.

With the above operations, a short second level period is set in the 1st phase in which the total length of the boundary line between adjoining pixel electrodes to which different driving voltages are applied is long and the load is large due to a leakage current between these pixel electrodes. On the other hand, in the 2nd and 3rd phases in which the total length of the boundary line between adjoining pixel electrodes to which different driving voltages are applied is shorter than in the 1st phase, the second level period is set longer than in the 1st phase (i.e., the ratio of the second period in a one-phase period is larger), and the current consumption can be reduced.

According to the seventh example of power supply control, it is possible to appropriately determine the length of the time period in which the current supply capability of the power supply circuit 24 is maintained at the first level or the second level, while considering a leakage current between adjoining pixel electrodes to which different driving voltages are applied.

Eighth Example of Power Supply Control

In an eighth example of power supply control, the power supply control unit 226 shown in FIG. 4 changes the current supply capability of the power supply circuit 24 from the second level to the first level in the case where the power supply voltage (VPP-VSS) becomes smaller than a predetermined voltage while the current supply capability of the power supply circuit 24 is maintained at the second level. Other points in the eighth example are similar to the first to fourth examples.

The voltage monitoring unit 25 measures the value of the power supply voltage (VPP-VSS) generated by the power supply circuit 24 at the time of the end of each frame when the electro-optical panel is driven. For example, the voltage monitoring unit 25 compares the power supply voltage generated by the power supply circuit 24 with a predetermined voltage (e.g., 13 V), and outputs a comparison result to the power supply control unit 226.

If the power supply voltage is lower than the predetermined voltage, the power supply control unit 226 sets the current supply capability of the power supply circuit 24 to the first level at the start timing of the next frame, and if not, the current supply capability of the power supply circuit 24 is maintained at the second level. Here, although the timing of setting the current supply capability of the power supply circuit 24 to the first level may be asynchronous with a timing of start of a frame, it is desirable that this setting timing is synchronous with a timing of start of a frame, considering ease of achieving reproducibility of the driving waveforms and DC balance. According to the eighth example, it is possible to reduce power consumption while maintaining a necessary driving voltage by monitoring the power supply voltage.

Ninth Example of Power Supply Control

In a ninth example of power supply control, the power supply control unit 226 shown in FIG. 4 sets the current supply capability of the power supply circuit 24 to a third level, which is lower than or equal to the first level and higher than the second level, in a precharging period that is prior to a driving period in which the driving voltage is generated in a plurality of phases. Other points in the ninth example are similar to the first to third examples.

The control unit 26 shown in FIG. 1, upon receiving a display start command from the host CPU 40, initially controls the power supply control unit 226 so as to start the power supply circuit 24 and execute a precharging operation. After the power supply voltage (VPP-VSS) generated by the power supply circuit 24 reaches 15 V, the control unit 26 controls the timing control unit 223 so as to generate a signal for displaying an image. Thereby, the driving voltage generation unit 23 starts to drive the electro-optical panel.

Here, the third level may be the same as the first level, or may be lower than the first level and higher than the second level. Provision of three types of level is achieved by the power supply control unit 226 varying the frequency of the voltage boosting clock signals supplied to the power supply circuit 24 in three ways, for example. According to the ninth example of power supply control, a voltage that is closer to a predetermined power supply voltage (15 V) can be applied to the driving voltage generation unit 23 from when the first frame starts.

Tenth Example of Power Supply Control

In a tenth example of power supply control, in the case where a second predetermined time period has elapsed since the power supply control unit 226 shown in FIG. 4 set the current supply capability of the power supply circuit 24 to the second level, the power supply control unit 226 sets the current supply capability of the power supply circuit 24 to a third level, which is lower than or equal to the first level and higher than the second level, in a first precharging period that is prior to a driving period in which the driving voltage is generated in a plurality of phases.

Also, in the case where the second predetermined time period has not elapsed since the power supply control unit 226 set the current supply capability of the power supply circuit 24 to the second level, the power supply control unit 226 sets the current supply capability of the power supply circuit 24 to the third level in a second precharging period, which is shorter than the first precharging period, or sets the current supply capability of the power supply circuit 24 to the first level at or after a timing of start of the driving period. Other points in the tenth example are similar to the first to third examples.

Eleventh Example of Power Supply Control

In an eleventh example of power supply control, in the case where the power supply voltage (VPP-VSS) becomes smaller than a predetermined voltage while the power supply control unit 226 shown in FIG. 4 maintains the current supply capability of the power supply circuit 24 at the second level, the power supply control unit 226 sets the current supply capability of the power supply circuit 24 to a third level, which is lower than or equal to the first level and higher than the second level, in a first precharging period that is prior to a driving period in which the driving voltage is generated in a plurality of phases.

In the case where the power supply voltage (VPP-VSS) does not become smaller than the predetermined voltage while the power supply control unit 226 maintains the current supply capability of the power supply circuit 24 at the second level, the power supply control unit 226 sets the current supply capability of the power supply circuit 24 to the third level in a second precharging period, which is shorter than the first precharging period, or sets the current supply capability of the power supply circuit 24 at the first level at or after a timing of start of the driving period. Other points in the eleventh example are similar to the first to third examples.

It is desirable to execute the precharging operation when a long time has passed since the previous driving, a long time has elapsed since the current supply capability of the power supply circuit 24 was set to the second level, and the power supply voltage (VPP-VSS) generated by the power supply circuit 24 has lowered. Accordingly, the power supply control unit 226 may execute the precharging operation only in the case where the elapsed time from the previous driving is longer than a second predetermined time at the time point when a display start command is transmitted from the host CPU 40, or where the measured value of the power supply voltage (VPP-VSS) generated by the power supply circuit 24 is lower than a predetermined value.

Also, the power supply control unit 226 may change the precharging time depending on the elapsed time from the previous driving or the measured value of the power supply voltage (VPP-VSS) generated by the power supply circuit 24. That is to say, the power supply control unit 226 may further shorten the precharging time in the case where the elapsed time from the previous driving is not longer than the second predetermined time period, or where the measured value of the power supply voltage (VPP-VSS) generated by the power supply circuit 24 is not lower than the predetermined value. According to the tenth and eleventh example of power supply control, it is possible to suppress the precharging time to the minimum and reduce power consumption using the charge stored in the capacitor in the previous driving period.

Although the above examples have described the case where the top plane electrode and the plurality of segment electrodes in the electro-optical panel are simultaneously driven, a configuration may also be employed in which the potential of the top plane electrode is fixed to a constant potential (e.g., 0 V), and only the plurality of segment electrodes are driven. In this case, the driving voltages to be applied to the segment electrodes have not two but three values. For example, the power supply circuit 24 shown in FIG. 1 generates a first power supply voltage of +15 V and a second power supply voltage of −15 V based on the power supply voltage (VDD-VSS) supplied from the power supply unit 70. As the waveform values, a waveform value "0" that indicates a driving voltage of 0 V, a waveform value "+1" that indicates a driving voltage of +15 V, and a waveform value "−1" that indicates a driving voltage of −15 V are used.

The invention can also be applied to an electro-optical panel of a dot-matrix type (simple matrix type or active matrix type). In this case, a plurality of scan lines and a plurality of data lines are sequentially driven, whereas the driving waveforms applied to the pixel electrodes are equal to the driving waveforms applied to the segment electrodes. For this reason, the same timing information, waveform information, and power supply control information as those in the above setting examples can be used.

Second Embodiment

Next, a second embodiment of the invention will be described. In the second embodiment, the display driver does not directly drive the pixel electrodes in the electro-optical panel, but drives the pixel electrodes via a plurality of pixel circuits provided so as to correspond to the plurality of pixels in the electro-optical panel. Other points in the second embodiment are similar to the first embodiment.

Figure 14:
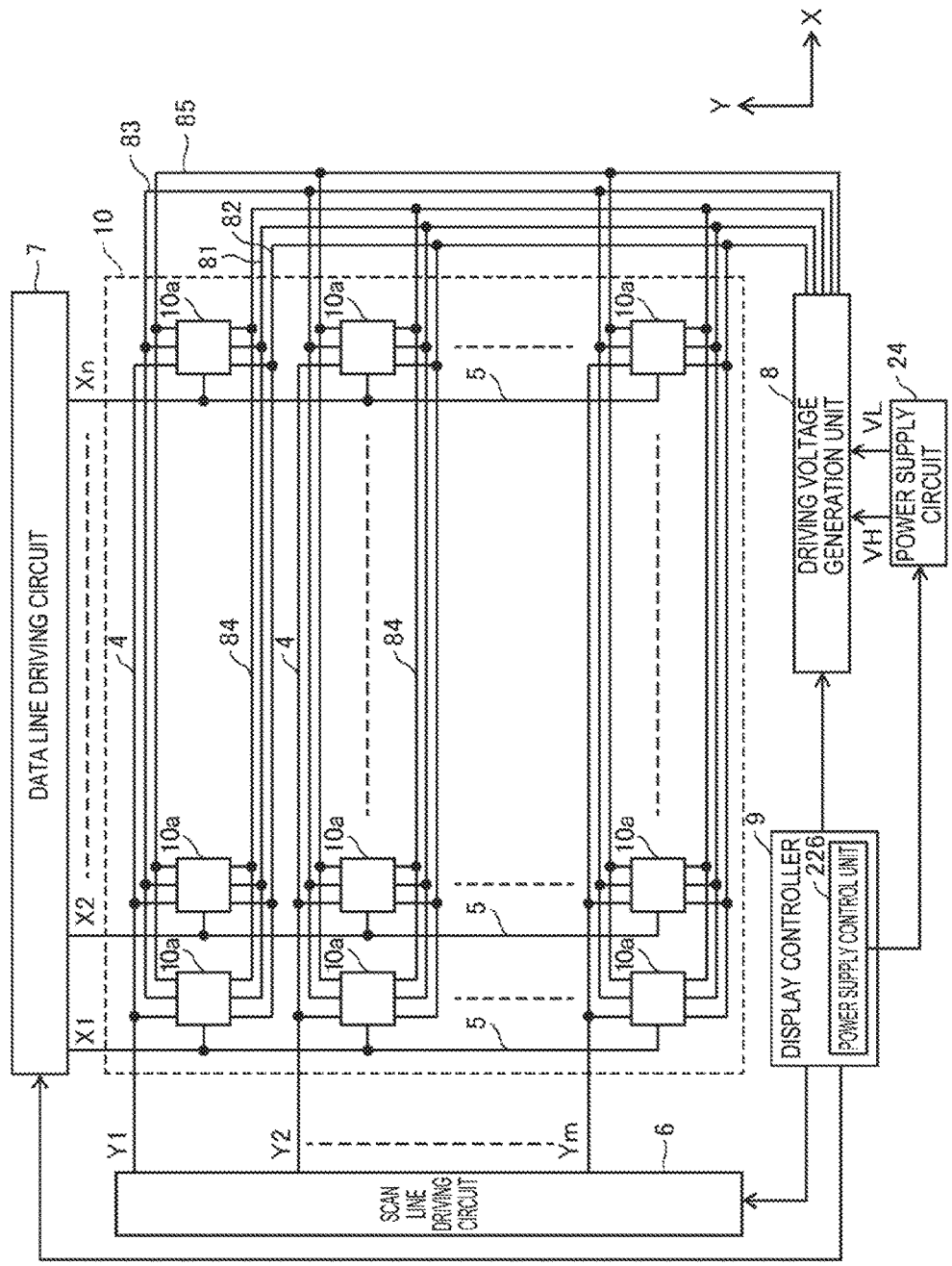
FIG. 14 is a diagram showing a part of a configuration of a display driver according to a second embodiment of the invention.

FIG. 14 is a diagram showing a part of a configuration of a display driver according to the second embodiment of the invention, together with an electro-optical panel. FIG. 14 shows, as constituent elements of the display driver, a scan line driving circuit 6, a data line driving circuit 7, a driving voltage generation unit 8, a display controller 9, and a power supply circuit 24. The constituent elements from the scan line driving circuit 6 to the display controller 9 are each constituted by a digital circuit or an analog circuit.

The display controller 9 has a function of controlling the scan line driving circuit 6 and the data line driving circuit 7 in addition to the function of the display controller 22 (FIG. 4) in the first embodiment. An integrated circuit device (e.g., a display driver IC) according to the second embodiment of the invention includes the constituent elements from the scan line driving circuit 6 to the display controller 9, and may further include the display data storage unit 21 and at least some of the constituent elements from the power supply circuit 24 to the host interface 28 shown in FIG. 1.

The electro-optical panel 10 is provided with a plurality of pixel circuits 10a in a matrix with m rows in a Y-axis direction and n columns in an X-axis direction. The scan line driving circuit 6 is connected to the pixel circuits 10a via a plurality of scan lines 4 (Y1, Y2, . . . , Ym) that extend in the X-axis direction in the electro-optical panel 10. The data line driving circuit 7 is connected to the pixel circuits 10a via a plurality of data lines 5 (X1, X2, . . . , Xn) that extend in the Y-axis direction in the electro-optical panel 10.

The driving voltage generation unit 8 is connected to the pixel circuits 10a via a first control line 81, a second control line 82, a first power supply line 83, a second power supply line 84, and a common electrode interconnect 85. The scan line driving circuit 6, the data line driving circuit 7, and the driving voltage generation unit 8 are controlled by the display controller 9. The power supply circuit 24 supplies a power supply potential VH on a high-potential side and a power supply potential VL on a low-potential side to the driving voltage generation unit 8 under the control of the power supply control unit 226 in the display controller 9.

Figure 15:
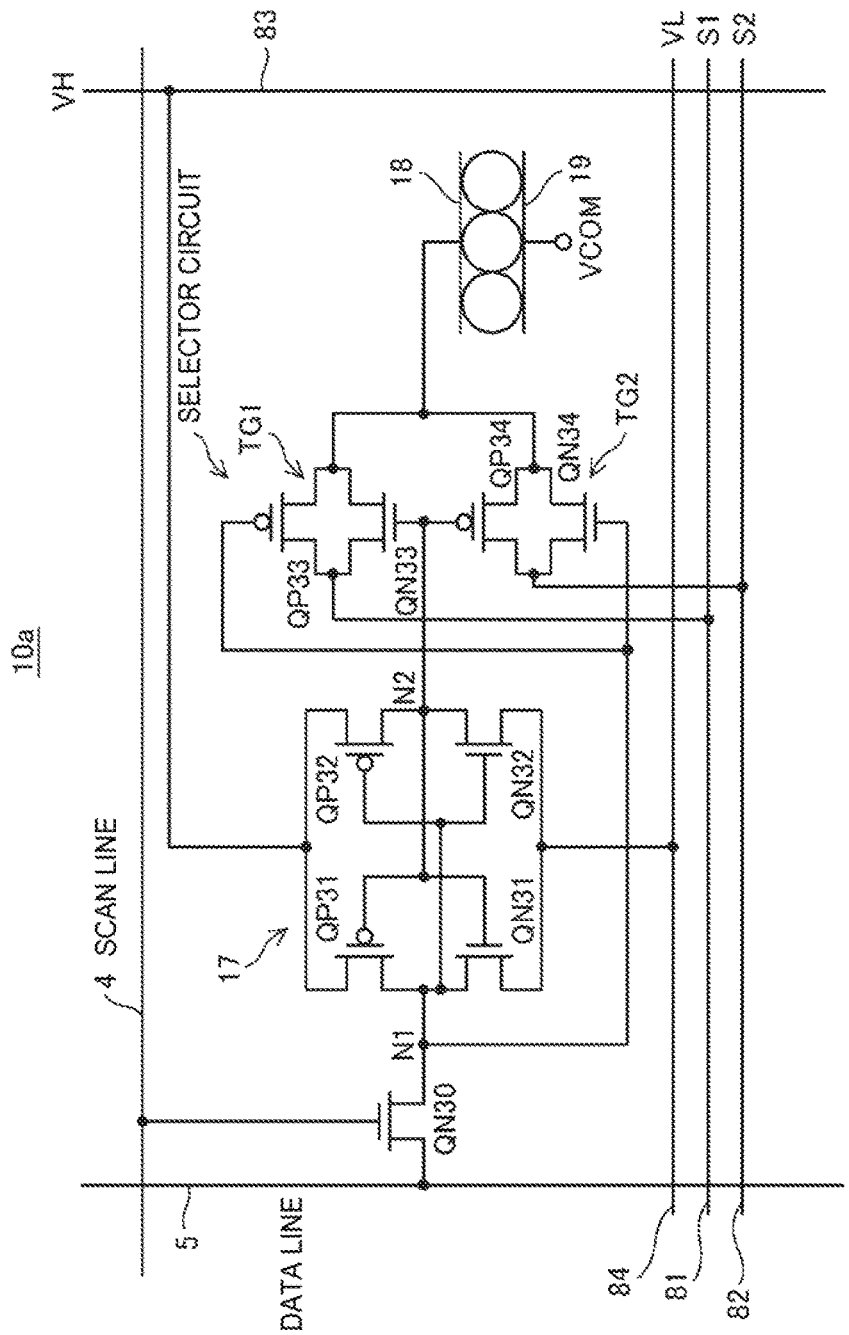
FIG. 15 is a diagram showing an exemplary configuration of a pixel circuit provided in an electro-optical panel shown in FIG. 14.

FIG. 15 is a diagram showing an exemplary configuration of the pixel circuit provided in the electro-optical panel shown in FIG. 14. As shown in FIG. 15, the pixel circuit 10a includes an N-channel MOS transistor QN30, which serves as a switching circuit, an SRAM (Static Random Access Memory) 17, which serves as a holding circuit, transmission gates TG1 and TG2, which constitute a selector circuit, and a pixel electrode 18 that is opposed to a common electrode 19 via an electrophoretic layer. The common electrode 19 is connected to the common electrode interconnect 85 (FIG. 14). In this example, it is assumed that white particles in the electrophoretic layer are positively charged, and black particles are negatively charged.

A scan line 4 is connected to a gate of the transistor QN30, a data line 5 is connected to a source thereof, and the SRAM 17 is connected to a drain thereof. The transistor QN30 electrically connects the data line 5 to the SRAM 17 and thereby causes image data supplied from the data line driving circuit 7 via the data line 5 to be input to the SRAM 17 in a time period in which a selection signal is applied to the transistor QN30 from the scan line driving circuit 6 via the scan line 4.

The SRAM 17 holds image data supplied from the data line 5 via the transistor QN30. The SRAM 17 includes P-channel MOS transistors QP31 and QP32, and N-channel MOS transistors QN31 and QN32, for example. Sources of the transistors QP31 and QP32 are connected to the first power supply line 83 to which the power supply potential VH on the high-potential side is supplied, and sources of the transistors QN31 and QN32 are connected to the second power supply line 84 to which the power supply potential VL on the low-potential side is supplied.

The SRAM 17 has an input node N1 connected to the drain of the transistor QN30, and an output node N2 connected to the selector circuit. The input node N1 is connected to gates of the transistors QP32 and QN32 and drains of the transistors QP31 and QN31. The output node N2 is connected to drains of the transistors QP32 and QN32 and gates of the transistors QP31 and QN31.

In the selector circuit, the transmission gate TG1 includes a P-channel MOS transistor QP33 and an N-channel MOS transistor QN33. The transmission gate TG2 includes a P-channel MOS transistor QP34 and an N-channel MOS transistor QN34.

Sources of the transistors QP33 and QN33 are connected to the first control line 81, and sources of the transistors QP34 and QN34 are connected to the second control line 82. Drains of the transistors QP33 and QN33 and the transistors QP34 and QN34 are connected to the pixel electrode 18.

The selector circuit selects one of the first control line 81 and the second control line 82 in accordance with image data held in the SRAM 17, and electrically connects the selected control line to the pixel electrode 18. At this time, only one of the transmission gates TG1 and TG2 turns on in accordance with the level of the image data.

Specifically, if low-level image data is input to the input node N1 of the SRAM 17, a high-level control signal is output from the output node N2. Accordingly, the transistor QP33 having a gate connected to the input node N1 turns on, and the transistor QN33 having a gate connected to the output node N2 turns on, thereby electrically connecting the first control line 81 to the pixel electrode 18.

On the other hand, if high-level image data is input to the input node N1 of the SRAM 17, a low-level control signal is output from the output node N2. Accordingly, the transistor QN34 having a gate connected to the input node N1 turns on, and the transistor QP34 having a gate connected to the output node N2 turns on, thereby electrically connecting the second control line 82 to the pixel electrode 18.

Next, operations of the display driver shown in FIG. 14 will be described with reference to FIGS. 14 to 16.

Figure 16:
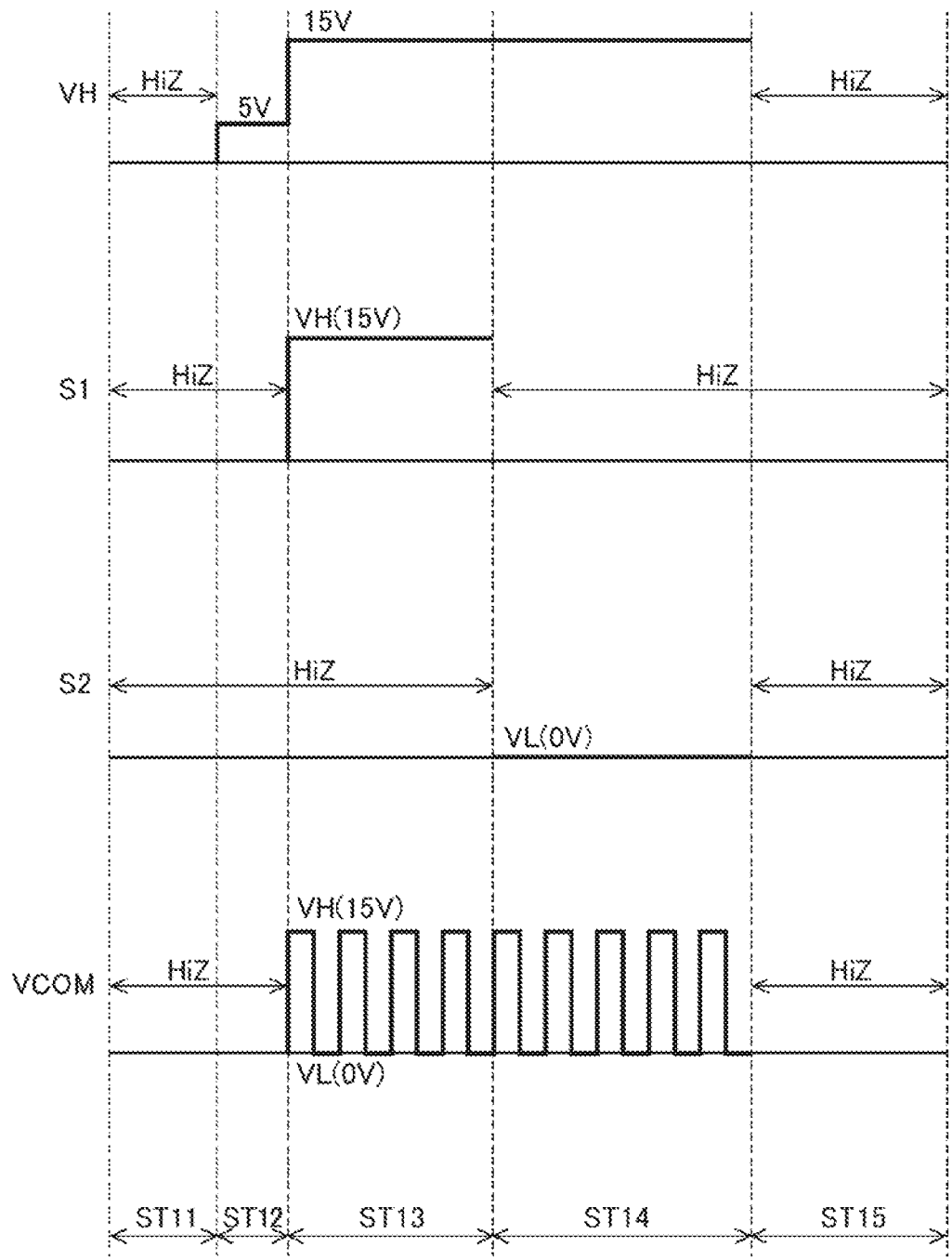
FIG. 16 is a timing chart for illustrating operations of the display driver shown in FIG. 14.

FIG. 16 is a timing chart for illustrating operations of the display driver shown in FIG. 14. In this example, an image is displayed on the electro-optical panel 10 by the display driver operating in a power-off period ST11, an image data input period ST12, a white display period ST13, a black display period ST14, and a power-off period ST15.

FIG. 16 shows a potential VH of the first power supply line 83, a potential S1 of the first control line 81, a potential S2 of the second control line 82, and a potential VCOM of the common electrode interconnect 85. Note that specific values shown in FIG. 16 are mere examples for facilitating understanding of the description, and do not limit the technical scope of the invention.

In the power-off period ST11 shown in FIG. 16, both the first control line 81 and the second control line 82 are in a floating state (high-impedance state: HiZ), i.e., are electrically disconnected from the other circuits. At this time, a previously displayed image is held in the electro-optical panel 10.

Next, in the image data input period ST12, the driving voltage generation unit 8 applies the power supply potential VH (5 V) on the high-potential side to the SRAM 17 of the pixel circuit 10a via the first power supply line 83, and applies the power supply potential VL (0V) on the low potential side to the SRAM 17 via the second power supply line 84. The SRAM 17 is thereby activated. At this time, the driving voltage generation unit 8 causes the first control line 81 and the second control line 82 to enter the floating state (HiZ), i.e., to be electrically disconnected.

The scan line driving circuit 6 supplies a selection signal to the scan line Y1. By this selection signal, the transistors QN30 of the pixel circuits 10a in a single row connected to the scan line Y1 turn on, and the SRAMs 17 of these pixel circuits 10a are connected to the respective data lines X1, X2, . . . , Xn. The data line driving circuit 7 supplies image data to the data lines X1, X2, . . . , Xn, and thereby inputs the image data to the SRAMs 17 of the pixel circuits 10a in the single row connected to the scan line Y1.

Upon the image data being input to the SRAMs 17 of the pixel circuits 10a in the single row connected to the scan line Y1, the scan line driving circuit 6 stops the supply of the selection signal to the scan line Y1 and cancels the selected state of the scan line Y1. The scan line driving circuit 6 sequentially executes this operation for scan lines Y2 to Ym, and thereby inputs the image data to the SRAMs 17 of all pixel circuits 10a in the electro-optical panel 10. Thereby, the image data is stored in the SRAMs 17 of all pixel circuits 10a.

Next, in the white display period ST13, the driving voltage generation unit 8 applies the power supply potential VH (15 V) on the high-potential side to the first power supply line 83. Thereby, the image data stored at 5 V in the SRAM 17 is stored at a higher potential (15 V). Also, the first control line 81 is electrically connected to the driving voltage generation unit 8, and the driving voltage generation unit 8 applies the power supply potential VH (15 V) on the high-potential side to the first control line 81. Thereby, the power supply potential VH (15 V) on the high-potential side is applied to a source of the transmission gate TG1.

Furthermore, the driving voltage generation unit 8 causes the second control line 82 to enter the floating state (HiZ), i.e., to be electrically disconnected. The driving voltage generation unit 8 also applies a pulse signal that repeats a high-level (VH (15 V)) period (phase) and a low-level (VL (0V)) period (phase) in a fixed cycle, to the common electrode 19 via the common electrode interconnect 85.

At this time, in the pixel circuit 10a in which the image data at the input node N1 of the SRAM 17 is at a low level, the potential of the output node N2 of the SRAM 17 is at a high level. Accordingly, the transmission gate TG1 turns on, and the first control line 81 is connected to the pixel electrode 18. Thereby, a high-level potential VH (15 V) is applied to the pixel electrode 18.

When the potential VCOM of the common electrode 19 to which the pulse signal is applied is at a low level (VL (0V)), a large potential difference occurs between the pixel electrode 18 and the common electrode 19, the negatively charged black particles are drawn toward the pixel electrode 18, and the positively charged white particles are drawn toward the common electrode 19. As a result, white color is displayed by this pixel.

On the other hand, in the pixel circuit 10a in which the image data at the input node N1 of the SRAM 17 is at a high level, the potential of the output node N2 of the SRAM 17 is at a low level. Accordingly, the transmission gate TG2 turns on, and the second control line 82 is connected to the pixel electrode 18. However, since the second control line 82 is electrically disconnected, the potential that displays the previous image is held as-is in the pixel electrode 18. As a result, the electrophoretic particles do not move in this pixel, and the previous image is maintained as-is.

Next, in the black display period ST14, the driving voltage generation unit 8 causes the first control line 81 to enter the floating state (HiZ), i.e., to be electrically disconnected. The driving voltage generation unit 8 also applies a low-level potential VL (0 V) to the second control line 82. Thereby, the low-level potential VL (0 V) is applied to a source of the transmission gate TG2 from the second control line 82.

At this time, in the pixel circuit 10*a* in which the image data at the input node N1 of the SRAM 17 is at a low level, the potential of the output node N2 of the SRAM 17 is at a high level. Accordingly, the transmission gate TG1 turns on, and the first control line 81 is connected to the pixel electrode 18. However, since the first control line 81 is electrically disconnected, the potential that displays the previous image is held as-is in the pixel electrode 18. As a result, the electrophoretic particles do not move in this pixel, and the previous image is maintained as-is.

On the other hand, in the pixel circuit 10*a* in which the image data at the input node N1 of the SRAM 17 is at a high level, the potential of the output node N2 of the SRAM 17 is at a low level. Accordingly, the transmission gate TG2 turns on, and the second control line 82 is connected to the pixel electrode 18. Thereby, a low-level potential VL (0 V) is applied to the pixel electrode 18.

When the potential VCOM of the common electrode 19 to which the pulse signal is applied is at a high level (VH (15 V)), a large potential difference occurs between the pixel electrode 18 and the common electrode 19, the positively charged white particles are drawn toward the pixel electrode 18, and the negatively charged black particles are drawn toward the common electrode 19. As a result, black color is displayed by this pixel.

The power-off period ST15 is provided after a new image is displayed on the electro-optical panel 10 as a result of the above operations. In the power-off period ST15, the driving voltage generation unit 8 electrically disconnects the first control line 81 and the second control line 82. Thereby, the pixel electrode 18 of the pixel circuit 10*a* enters the floating state. Accordingly, in the power-off period ST15, the image can be maintained without consuming the power.

Furthermore, sequentially updated images can be displayed on the electro-optical panel 10 by repeating the image data input period ST12, the white display period ST13, the black display period ST14, and the power-off period ST15 (ST11).

FIGS. 17A and 17B are diagrams showing states where display of some pixels is changed according to the second embodiment. FIG. 17A shows a state of the electro-optical panel in a step 1 (white display period). It is assumed that all pixels display black color in the previous image. As shown in FIG. 17A, in a pixel group A, the transmission gate TG1 turns on, the transmission gate TG2 turns off, and a signal S1 of the first control line 81 is applied to the pixel electrode 18. Since the signal S1 of the first control line 81 is at a high level (VH), the positively charged white particles are drawn toward the common electrode 19 when the common electrode 19 is at a low level (VL), and white color is displayed in the pixel group A.

On the other hand, in a pixel group B, the transmission gate TG1 turns off, the transmission gate TG2 turns on, and a signal S2 of the second control line 82 is applied to the pixel electrode 18. Since the second control line 82 is electrically disconnected, the electrophoretic particles do not move in the pixel group B, and black color of the previous image is maintained as-is.

FIG. 17B shows a state of the electro-optical panel in a step 2 (black display period). It is assumed that all pixels display white color in the previous image. As shown in FIG. 17B, in the pixel group A, the transmission gate TG1 turns on, the transmission gate TG2 turns off, and the signal S1 of the first control line 81 is applied to the pixel electrode 18. Since the first control line 81 is electrically disconnected, the electrophoretic particles do not move in the pixel group A, and white color of the previous image is maintained as-is.

On the other hand, in the pixel group B, the transmission gate TG1 turns off, the transmission gate TG2 turns on, and the signal S2 of the second control line 82 is applied to the pixel electrode 18. Since the signal S2 of the second control line 82 is at a low level (VL), the negatively charged black particles are drawn toward the common electrode 19 when the common electrode 19 is at a high level (VH), and black color is displayed in the pixel group B.

In the case of maintaining the previous image in FIGS. 17A and 17B, a leakage current does not flow between the pixel electrode 18 and the common electrode 19 since either the first control line 81 or the second control line 82 is disconnected. Accordingly, the power consumption in the power supply circuit 24 can be reduced.

FIGS. 18A to 18C are diagrams showing states where display of all pixels is unified according to the second embodiment. FIG. 18A shows the state of the electro-optical panel in the step 2 (black display period) as FIG. 17B does. FIG. 18B shows a state of the electro-optical panel in the case of changing the display state to all-white display from the step 2, and FIG. 18C shows a state of the electro-optical panel in the case of changing the display state to all-black display from the step 2.

As shown in FIG. 18B, in the pixel group A, the transmission gate TG1 turns on, the transmission gate TG2 turns off, and the signal S1 of the first control line 81 is applied to the pixel electrode 18. Since the first control line 81 is electrically disconnected, the electrophoretic particles do not move in the pixel group A, and white color of the previous image is maintained as-is.

On the other hand, in the pixel group B, the transmission gate TG1 turns off, the transmission gate TG2 turns on, and the signal S2 of the second control line 82 is applied to the pixel electrode 18. Since the signal S2 of the second control line 82 is at a high level (VH), the positively charged white particles are drawn toward the common electrode 19 when the potential VCOM of the common electrode 19 is at a low level (VL), and white color is displayed in the pixel group B.

As shown in FIG. 18C, in the pixel group A, the transmission gate TG1 turns on, the transmission gate TG2 turns off, and the signal S1 of the first control line 81 is applied to the pixel electrode 18. Since the signal S1 of the first control line 81 is at a low level (VL), the negatively charged black particles are drawn toward the common electrode 19 when the common electrode 19 is at a high level (VH), and black color is displayed in the pixel group A.

On the other hand, in the pixel group B, the transmission gate TG1 turns off, the transmission gate TG2 turns on, and the signal S2 of the second control line 82 is applied to the pixel electrode 18. Since the second control line 82 is electrically disconnected, the electrophoretic particles do not move in the pixel group B, and black color of the previous image is maintained as-is.

As shown in FIGS. 18A to 18C, data in the SRAM 17 in the pixel circuit 10*a* does not need to be rewritten in both the case of changing the display state to all-white display from the step 2 and the case of changing the display state to all-black display from the step 2. Accordingly, the power consumption in the power supply circuit 24 can be reduced.

With the above configurations, the power supply control unit 226 in the display controller 9 shown in FIG. 14 sets the current supply capability of the power supply circuit 24 to the first level synchronously with the timing of a change of the potential applied to the first control line 81, the second control line 82, or the common electrode 19. The timing of setting the current supply capability of the power supply circuit 24 to the first level may be identical to the timing of a potential change, or may be earlier or later than the timing of a potential change by a fixed time period, or may be determined in accordance with various conditions as described above in detail.

Also, the power supply control unit 226 sets the current supply capability of the power supply circuit 24 to the second level, which is lower than the first level, after at least a predetermined time period has elapsed since the current supply capability of the power supply circuit 24 was set to the first level. Here, the predetermined time period is a one-frame period, for example. The timing of setting the current supply capability of the power supply circuit 24 to the second level may be determined in accordance with various conditions, as described above in detail.

Thereby, when changing the potential applied to the first control line 81, the second control line 82, or the common electrode 19 in the electro-optical panel 10, the current supply capability of the power supply circuit 24 is increased to the first level, and thereafter the current supply capability of the power supply circuit 24 decreases to the second level. It is accordingly possible to reduce the power consumption at the time of driving the electro-optical panel 10 while suppressing degradation in optical properties of the electro-optical panel 10.

The invention is not limited to the above-described embodiments, and may be varied in various manners within the technical idea of the invention by those who have common knowledge in the relevant technical field.

This application claims priority from Japanese Patent Application No. 2015-033758 filed in the Japanese Patent Office on Feb. 24, 2015 the entire disclosure of which is hereby incorporated by reference in its entirely.

What is claimed is:

1. An integrated circuit device that drives an electro-optical panel using a driving waveform which is set in a plurality of phases, comprising:
    a driving voltage generator that operates as a result of receiving a supply of a power supply voltage generated by a power supply circuit, and generates a plurality of driving voltages to be applied to a plurality of electrodes in the electro-optical panel in each of a plurality of phases, in accordance with display data; and
    a power supply controller that sets current supply capability of the power supply circuit to a first level synchronously with a timing of start of a phase, and sets the current supply capability of the power supply circuit to a second level, which is lower than the first level, after at least a predetermined time period has elapsed since the current supply capability of the power supply circuit was set to the first level.

2. The integrated circuit device according to claim 1, wherein the power supply controller sets the current supply capability of the power supply circuit to the first level by operating the power supply circuit in a standard power mode, and sets the current supply capability of the power supply circuit to the second level by operating the power supply circuit in a low power consumption mode or stopping an operation of the power supply circuit.

3. The integrated circuit device according to claim 1, wherein the power supply controller sets the current supply capability of the power supply circuit to the first level by operating the power supply circuit in a standard power mode, and sets the current supply capability of the power supply circuit to the second level by alternately operating the power supply circuit in the standard power mode and in a low power consumption mode or intermittently operating the power supply circuit.

4. The integrated circuit device according to claim 1, wherein the power supply controller determines the length of a time period in which the current supply capability of the power supply circuit is maintained at the first level or the second level, in accordance with a temperature measured by a temperature sensor.

5. The integrated circuit device according to claim 1, wherein the power supply controller determines the length of a time period in which the current supply capability of the power supply circuit is maintained at the first level or the second level, in accordance with the number of output terminals to which a driving voltage is applied that changes at a timing of start of a phase, or the total area of pixel electrodes connected to the output terminals in the electro-optical panel.

6. The integrated circuit device according to claim 1, wherein the power supply controller determines the length of a time period in which the current supply capability of the power supply circuit is maintained at the first level or the second level, in accordance with the total length of a boundary line between adjoining pixel electrodes to which different driving voltages are applied in the electro-optical panel after a phase starts.

7. The integrated circuit device according to claim 1, further comprising:
    a voltage monitoring unit that measures the power supply voltage generated by the power supply circuit,
    wherein the power supply controller changes the current supply capability of the power supply circuit from the second level to the first level in a case where the power supply voltage becomes smaller than a predetermined voltage while the current supply capability of the power supply circuit is maintained at the second level.

8. The integrated circuit device according to claim 1, wherein the power supply controller sets the current supply capability of the power supply circuit to a third level, which is lower than or equal to the first level and higher than the second level, in a precharging period that is prior to a driving period in which the driving voltage is generated in a plurality of phases.

9. The integrated circuit device according to claim 1, wherein, in a case where a second predetermined time period has elapsed since the current supply capability of the power supply circuit was set to the second level, the power supply controller sets the current supply capability of the power supply circuit to a third level, which is lower than or equal to the first level and higher than the second level, in a first precharging period that is prior to a driving period in which the driving voltage is generated in a plurality of phases, and in a case where the second predetermined time period has not elapsed since the current supply capability of the power supply circuit was set to the second level, the power supply controller sets the current supply capability of the power supply circuit to the third level in a second precharging period, which is shorter than the first precharging period, or sets the current supply capability of the power supply circuit to the first level at or after a timing of start of the driving period.

10. The integrated circuit device according to claim 1, further comprising:
a voltage monitoring unit that measures the power supply voltage generated by the power supply circuit,
wherein in a case where the power supply voltage becomes smaller than a predetermined voltage while the current supply capability of the power supply circuit is maintained at the second level, the power supply controller sets the current supply capability of the power supply circuit to a third level, which is lower than or equal to the first level and higher than the second level in a first precharging period that is prior to a driving period in which the driving voltage is generated in a plurality of phases, and in a case where the power supply voltage does not become smaller than the predetermined voltage, the power supply controller sets the current supply capability of the power supply circuit to the third level in a second precharging period, which is shorter than the first precharging period, or sets the current supply capability of the power supply circuit to the first period at or after a timing of start of the driving period.

11. The integrated circuit device according to claim 1, further comprising:
a power supply boosting circuit that boosts a power supply boosting voltage supplied from outside to generate a boosted power supply voltage by performing a charge-pump operation in accordance with a clock signal,
wherein the power supply controller changes the current supply capability of the power supply circuit by changing the frequency of the clock signal supplied to the power supply boosting circuit, or controlling whether to supply the clock signal to the power supply boosting circuit.

12. An electronic device comprising:
an electro-optical panel; and
the integrated circuit device according to claim 1.

13. The electronic device according to claim 12,
wherein the electro-optical panel is provided with a pixel circuit including: a pixel electrode opposed to a common electrode; a switching circuit connected to a data line; a holding circuit that holds image data supplied from the data line via the switching circuit; and a selector circuit that electrically connects selected one of a first control line and a second control line to the pixel electrode in accordance with the image data held by the holding circuit, and
the power supply controller sets current supply capability of the power supply circuit to a first level synchronously with a timing of a change of a potential applied to the first control line, the second control line, or the common electrode, and sets the current supply capability of the power supply circuit to a second level, which is lower than the first level, after at least a predetermined time period has elapsed since the current supply capability of the power supply circuit was set to the first level.

14. An integrated circuit device that drives an electro-optical element, comprising:
a driving voltage generator that receives a power supply voltage from a power supply circuit and generates a driving voltage in each of a plurality of phases in accordance with display data; and
a power supply controller that sets current supply capability of the power supply circuit to a first level at a first timing synchronously with a timing of start of a first phase of the plurality of phases, and sets the current supply capability to a second level, which is lower than the first level, after a predetermined period from the first timing.

* * * * *